United States Patent [19]
Yoshida et al.

[11] Patent Number: 6,049,770
[45] Date of Patent: Apr. 11, 2000

[54] VIDEO AND VOICE SIGNAL PROCESSING APPARATUS AND SOUND SIGNAL PROCESSING APPARATUS

[75] Inventors: Junji Yoshida, Kyoto; Akira Iketani, Higashiosaka; Chiyoko Matsumi, Suita; Tatsuro Juri, Osaka, all of Japan

[73] Assignee: Matsushita Electric Industrial Co., Ltd., Osaka, Japan

[21] Appl. No.: 09/000,186

[22] PCT Filed: May 15, 1997

[86] PCT No.: PCT/JP97/01641

§ 371 Date: May 23, 1998

§ 102(e) Date: May 23, 1998

[87] PCT Pub. No.: WO97/44953

PCT Pub. Date: Nov. 27, 1997

[30] Foreign Application Priority Data

| May 21, 1996 | [JP] | Japan | 8/125240 |
| May 1, 1997 | [JP] | Japan | 9/114098 |

[51] Int. Cl.[7] .................................................. G10L 9/00
[52] U.S. Cl. ................. 704/500; 704/270; 704/501; 704/502; 704/503; 704/504
[58] Field of Search ............................... 704/500, 501, 704/502, 503, 504, 270; 348/422; 378/377; 382/232, 254, 282

[56] References Cited

FOREIGN PATENT DOCUMENTS

| 2-279078 | 11/1990 | Japan . |
| 2-299398 | 12/1990 | Japan . |
| 5-130565 | 5/1993 | Japan . |
| 6-339117 | 12/1994 | Japan . |
| 7-95522 | 4/1995 | Japan . |
| 9-74538 | 3/1997 | Japan . |

OTHER PUBLICATIONS

Japanese language search report for Int'l Appln No. PCT/JP97/01641 dated Sep. 9, 1997.

English translation of Japanese language search report.

*Primary Examiner*—David R. Hudspeth
*Assistant Examiner*—Susan Wieland
*Attorney, Agent, or Firm*—Ratner & Prestia

[57] ABSTRACT

A video and voice signal processing apparatus is provided. The apparatus includes a signal receiving circuit for receiving an input signal containing a plurality of frames, each frame having an encoded voice signal block and an encoded video signal block. The signal receiving circuit separates the encoded voice signal block from the encoded video signal block in each frame. A voice signal processor converts the encoded voice signal block into a voice signal. Also included is a video extracting circuit which decimates a plurality of encoded video signal blocks and extracts one of the encoded video signal blocks as a representative video signal. A video signal processor converts the representative video signal into a video signal.

5 Claims, 13 Drawing Sheets

TIME

1. SOUND SIGNAL PROCESSING APPARATUS

2. SOUND SIGNAL TRANSMITTING APPARATUS

A. REPRODUCED SOUND SIGNAL

B. OUTPUT SOUND SIGNAL

3. SOUND SIGNAL EXTRACTION CIRCUIT

4. D/A CONVERSION CIRCUIT

5. FR SPEAKER

6. FL SPEAKER

C. FR EXTRACTED SOUND SIGNAL

D. FL EXTRACTED SOUND SIGNAL

C'. FR OUTPUT SOUND SIGNAL

D'. FL OUTPUT SOUND SIGNAL

Fig. 12

| FR1 | FL1 | RR1 | RL1 | FR2 | FL2 | RR2 | RL2 | FR3 | ----- |

| FR1 | FR2 | FR3 | FR4 | -------- |

(b)

| FL1 | FL2 | FL3 | FL4 | -------- |

Fig. 14
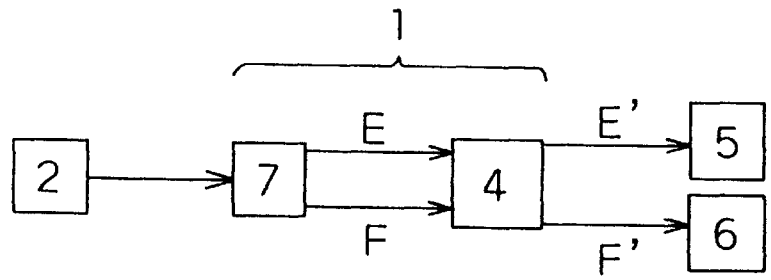
7. SOUND SIGNAL AVERAGING CIRCUIT
E. R AVERAGE SOUND SIGNAL
F. L AVERAGE SOUND SIGNAL
E'. R OUTPUT SOUND SIGNAL
F'. L OUTPUT SOUND SIGNAL
Fig. 15
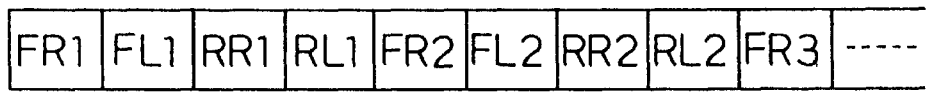
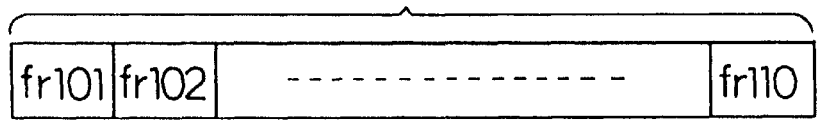
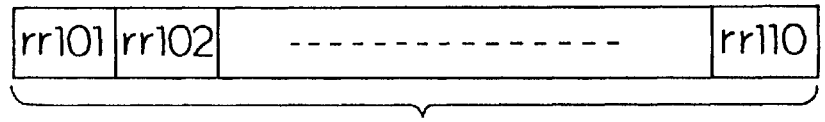

Fig. 18

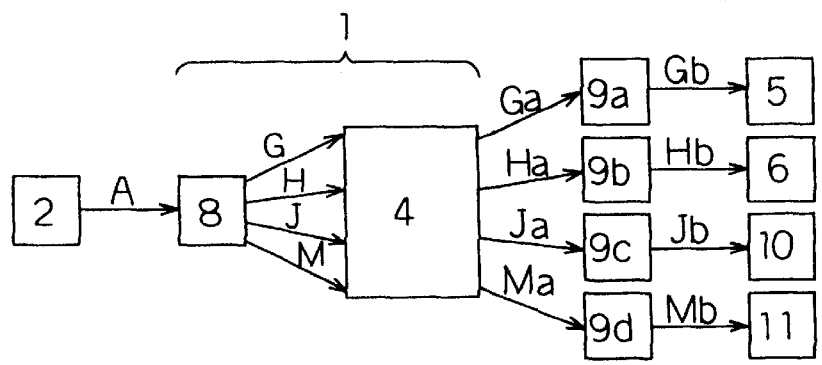

8. BIT COUNT REDUCTION CIRCUIT

9a. FR BIT COUNT DEMODULATION CIRCUIT

9b. FL BIT COUNT DEMODULATION CIRCUIT

9c. RR BIT COUNT DEMODULATION CIRCUIT

9d. RL BIT COUNT DEMODULATION CIRCUIT

10. RR SPEAKER
11. RL SPEAKER
G. FR BIT COUNT REDUCED SOUND SIGNAL

H. FL BIT COUNT REDUCED SOUND SIGNAL

J. RR BIT COUNT REDUCED SOUND SIGNAL

M. RL BIT COUNT REDUCED SOUND SIGNAL

Ga. FR ANALOG SOUND SIGNAL

Ha. FL ANALOG SOUND SIGNAL

Ja. RR ANALOG SOUND SIGNAL

Ma. RL ANALOG SOUND SIGNAL
Gb. FR OUTPUT SOUND SIGNAL

Hb. FL OUTPUT SOUND SIGNAL

Jb. RR OUTPUT SOUND SIGNAL

Mb. RL OUTPUT SOUND SIGNAL

FR ANALOG SOUND SIGNAL Ga    FR OUTPUT SOUND SIGNAL Gb

Fig. 21

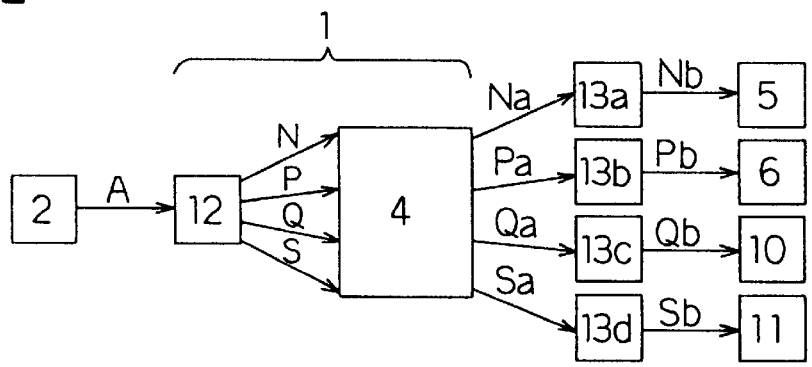

12. SAMPLE DELETION CIRCUIT

13a. FR SAMPLE DEMODULATION CIRCUIT

13b. FL SAMPLE DEMODULATION CIRCUIT

13c. RR SAMPLE DEMODULATION CIRCUIT

13d. RL SAMPLE DEMODULATION CIRCUIT

N. FR SAMPLE DELETED SOUND SIGNAL

P. FL SAMPLE DELETED SOUND SIGNAL

Q. RR SAMPLE DELETED SOUND SIGNAL

S. RL SAMPLE DELETED SOUND SIGNAL

Na. FR ANALOG SOUND SIGNAL

Pa. FL ANALOG SOUND SIGNAL

Qa. RR ANALOG SOUND SIGNAL

Sa. RL ANALOG SOUND SIGNAL

Nb. FR OUTPUT SOUND SIGNAL

Pb. FL OUTPUT SOUND SIGNAL

Qb. RR OUTPUT SOUND SIGNAL

Sb. RL OUTPUT SOUND SIGNAL

Fig. 22
(a)
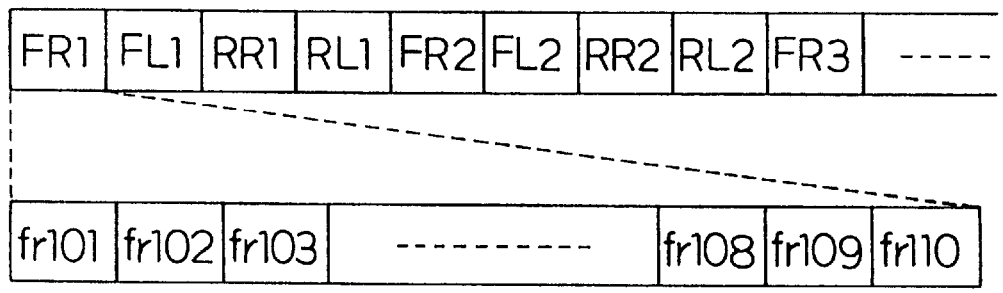
(b)
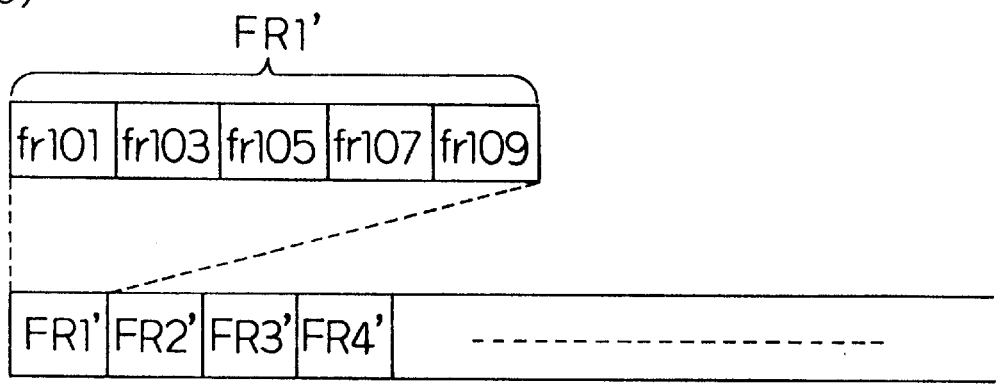

VIDEO AND VOICE SIGNAL PROCESSING APPARATUS AND SOUND SIGNAL PROCESSING APPARATUS

This Application is a U.S. National Phase Application of PCT International Application PCT/JP97/01641.

TECHNICAL FIELD

The present invention relates to a video and voice signal processing apparatus that outputs an intelligible voice signal even if frame decimation is applied to a video signal when processing digital video and digital audio signals.

The invention also relates to a sound signal processing apparatus that reduces the amount of information in a digital sound signal.

BACKGROUND ART

Nowadays, encoding is often performed when transmitting or storing video signals and voice signals. Especially, in the case of video signals which carry enormous amounts of data, high-efficiency encoding (hereinafter called compression) is performed to reduce the amount of data, thereby reducing transmission or storage costs.

Encoded signals are subjected to decoding for reproduction; when the signals are in compressed form, expansion must also be performed. Generally, expansion often requires complex calculations, and in the case of moving images and the like which are to be processed in real time, high processing speed is needed.

There are, however, not a few cases where sufficient processing speeds cannot be obtained, for example, when performing processing by computer software. In such cases, appropriate decimation is applied to the input moving image signal to reduce the amount of data and to permit realtime processing.

One decimation technique frequently used is frame decimation. This technique decimates an input signal on a frame by frame basis when it is input.

A description will be given below of one example of a prior art video and voice signal processing apparatus in which an input moving image signal is first subjected to frame decimation and then to expansion and decoding, thus outputting a video signal and a voice signal. FIG. 7 is a block diagram showing the configuration of the prior art video and voice signal processing apparatus. In FIG. 7, 701 is a signal receiving circuit, 702 is a signal extraction circuit, 703 is a video signal processing circuit, 704 is a voice signal processing circuit, 705 is an input signal, 706 is an encoded video signal, 707 is an encoded voice signal, 708 is a video signal, and 709 is a voice signal.

FIG. 8 is an explanatory diagram showing individual frames of the input signal 705 arranged along the time axis. In FIG. 8, 801*a* and 802*d* are frames to be decoded, and 802*b*, 802*c*, 802*e*, and 802*f* are frames to be discarded by frame decimation.

The operation of the thus configured video and voice signal processing apparatus will be described. As an example, it is assumed here that two frames out of every three frames are discarded by frame decimation. In FIG. 7, the signal receiving circuit 701 receives the input signal 705, and supplies it to the signal extraction circuit 702. The signal extraction circuit 702 extracts signals corresponding to the frames 801*a* and 801*d* from the thus supplied input signal 705, separates the encoded video signal 706 and the encoded voice signal 707 from the extracted signals, and supplies them to the video signal processing circuit 703 and the voice signal processing circuit 704, respectively. At this time, signals corresponding to the frames 802*b*, 802*c*, 802*e*, and 802*f* of the input signal 705 are discarded. The video signal processing circuit 703 decodes the encoded video signal 706 thus supplied, and outputs the decoded signal as the video signal 708. Likewise, the voice signal processing circuit 704 decodes the encoded voice signal 707 thus supplied, and outputs the decoded signal as the voice signal 709.

However, in the above-described prior art configuration, not only the video signal but the voice signal is also decimated as a result of the frame decimation. Generally, when frame decimation is applied to a video signal, the video can still be recognized as a moving image though the motion becomes jerky; on the other hand, when frame decimation is applied to a voice signal, there occurs the problem that the voice can no longer be recognized as voice since signal continuity is lost.

The present invention has been devised in view of the frame decimation problem of the prior art, and an object of the invention is to provide a video and voice signal processing apparatus capable of outputting a voice signal recognizable as voice even when frame decimation is applied.

On the other hand, with the advance of digital signal technologies, sound is increasingly being recorded and reproduced using digital signals.

Nowadays, compact discs and minidiscs on which sound is recorded using digital sound signals are predominant as sound recording media for recording sound. In television broadcasting also, systems for transmitting both video and sound using digital signals are beginning to be employed, as seen in digital satellite broadcasting. Further, personal computers are increasingly used for sound processing such as recording or reproduction using digital sound signals; nowadays, with improvements in the performance of personal computers, it is not uncommon for personal computers to reproduce video and sound simultaneously by using digital signals.

As shown in FIG. 9, a prior art sound signal processing apparatus 1 is an apparatus that accepts at its input a reproduced sound signal A of a digital sound signal transmitted from a sound signal transmitting apparatus 2, and that converts it into an analog sound signal and outputs the analog sound signal as an output sound signal B.

In recent years, advances have been made in sound quality and sound multiplexing in stereo broadcasting or the like, and the reproduced sound signal A from the sound signal transmitting apparatus 2 may contain a large amount of information.

However, since the above prior art sound signal processing apparatus 1 converts the reproduced sound signal A into an analog sound signal in the order in which it is input, if the reproduced sound signal A is a signal containing a large amount of information, problems will occur, such as interruptions in the sound corresponding to the reproduced sound signal A, unless the speed with which the sound signal processing apparatus 1 converts the reproduced sound signal A into the analog output sound signal B is fast enough.

DISCLOSURE OF THE INVENTION

A first aspect of the present invention concerns a video and voice signal processing apparatus which comprises: signal receiving means for receiving an input signal containing an encoded video signal and an encoded voice signal, and for recovering from the input signal the encoded video signal and encoded voice signal for output; video signal extracting means for extracting a designated frame from the encoded video signal, and for outputting the extracted frame as a representative video signal; video signal processing means for applying prescribed processing to the representative video signal, and for outputting the thus processed signal as a video signal; and voice signal processing means for applying prescribed processing to the encoded voice signal, and for outputting the thus processed signal as a voice signal.

In this configuration, frame decimation is applied to the encoded video signal, but is not applied to the encoded voice signal; therefore, all voice signals can be output unchanged.

This invention also provides a video and voice signal processing apparatus which comprises: signal receiving means for receiving an input signal containing an encoded video signal and an encoded voice signal, and for recovering from the input signal the encoded video signal and encoded voice signal for output; video signal extracting means for extracting a designated frame from the encoded video signal, and for outputting the extracted frame as a representative video signal; video signal processing means for applying prescribed processing to the representative video signal, and for outputting the thus processed signal as a video signal; voice signal extracting means for extracting designated information frame by frame from the encoded voice signal, and for outputting the extracted information as a representative voice signal; and voice signal processing means for applying prescribed processing to the representative voice signal, and for outputting the thus processed signal as a voice signal.

In this configuration, since only representative information is extracted from every frame of the encoded voice signal, sound quality degrades but an uninterrupted and intelligible voice signal can be output.

A second aspect of the present invention considers the problem of the earlier described prior art sound signal processing apparatus, that is, the slow speed in converting a digital sound signal containing a large amount of information into an analog sound signal, and thus provides a sound signal processing apparatus that converts a digital sound signal containing a large amount of information into an analog sound signal at high speed.

This invention provides a sound signal processing apparatus which comprises: extracting means for taking as an input a composite digital sound signal representing digitally a plurality of sounds that are related to each other, and for extracting from the composite digital sound signal a digital sound signal corresponding to one or more of the sounds; and signal converting means for converting the digital sound signal extracted by the extracting means into an analog sound signal.

This invention also provides a sound signal processing apparatus which comprises: averaging means for taking as an input a digital sound signal representing a plurality of sounds that are related to each other, each sound being represented by a prescribed number of samples, and for averaging digital values of signals sampled at the same sampling instant between digital sound signals corresponding to two or more sounds arbitrarily selected from among the plurality of sounds; signal converting means for converting the averaged digital sound signals and/or unaveraged digital sound signals into analog sound signals.

This invention further provides a sound signal processing apparatus which comprises: bit count reducing means for taking as an input a digital sound signal sampled, quantized, and expressed by k bits, and for extracting high-order j bits (k>j) of the k bits of the digital sound signal; and signal converting means for converting a digital sound signal consisting of the j bits extracted by the bit count reducing means into an analog sound signal while considering the j bits are high-order bits of the k-bit digital sound signal.

This invention also provides a sound signal processing apparatus which comprises: sample deleting means for taking as an input a digital sound signal consisting of a prescribed number of samples, and for deleting samples from the digital sound signal with a prescribed periodicity; and signal converting means for converting digital sound signals left undeleted by the sample deleting means into analog sound signals.

BRIEF DESCRIPTION OF THE DRAWINGS

FIG. 12 is a structural diagram of a reproduced sound signal A in the fifth embodiment of the present invention.

FIG. 13 is a structural diagram of an FR extracted sound signal C and an FL extracted sound signal D in the fifth embodiment of the present invention.

FIG. 14 is a block diagram of a sound signal processing apparatus according to a sixth embodiment of the present invention.

FIG. 15 is a structural diagram of the reproduced sound signal A in the sixth embodiment of the present invention.

FIG. 18 is a block diagram of a sound signal processing apparatus according to a seventh embodiment of the present invention.

FIG. 21 is a block diagram of a sound signal processing apparatus according to an eighth embodiment of the present invention.

FIG. 22 is a structural diagram of the reproduced sound signal A and FR sample deleted sound signal N in the eighth embodiment of the present invention.

DESCRIPTION OF THE REFERENCE CHARACTERS

Figure 1:
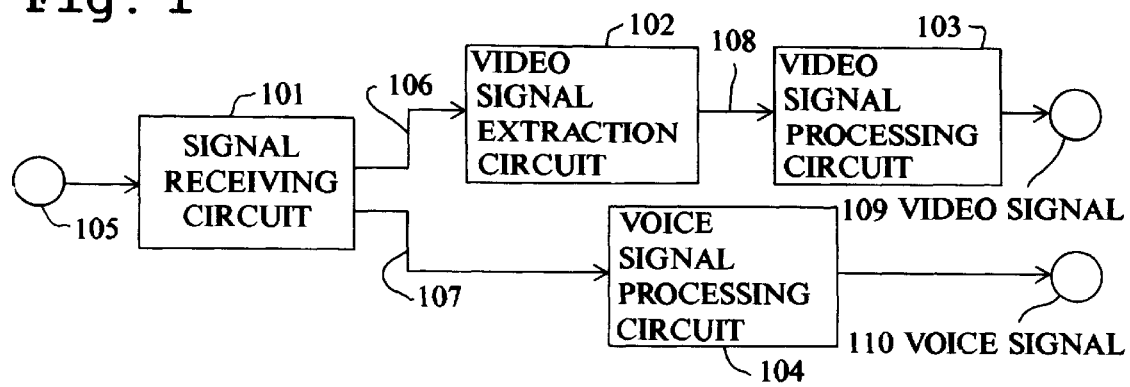
FIG. 1 is a block diagram of a video and voice signal processing apparatus according to a first embodiment of the present invention.

101. SIGNAL RECEIVING CIRCUIT
102. VIDEO SIGNAL EXTRACTION CIRCUIT
103. VIDEO SIGNAL PROCESSING CIRCUIT
104. VOICE SIGNAL PROCESSING CIRCUIT
105. INPUT SIGNAL
106. ENCODED VIDEO SIGNAL
107. ENCODED VOICE SIGNAL
108. REPRESENTATIVE VIDEO SIGNAL
109. VIDEO SIGNAL
110. VOICE SIGNAL
201. n-TH FRAME IN INPUT SIGNAL 105
202, 202a, 202b, 202c, 202d, 202e, 202f. ENCODED VIDEO SIGNAL BLOCKS
203, 203a, 203b, 203c, 203d, 203e, 203f. ENCODED VOICE SIGNAL BLOCKS
301a, 301d. FRAMES WHERE ENCODED VIDEO SIGNAL BLOCKS ARE DECODED
302b, 302c, 302e, 302f. FRAMES WHERE ENCODED VIDEO SIGNAL BLOCKS ARE NOT DECODED BUT DISCARDED
401. SIGNAL RECEIVING CIRCUIT
402. VOICE SIGNAL EXTRACTION CIRCUIT
403. VOICE SIGNAL PROCESSING CIRCUIT
404. INPUT SIGNAL
405. ENCODED VOICE SIGNAL
406. REPRESENTATIVE VOICE SIGNAL
407. VOICE SIGNAL
501. n-TH FRAME IN INPUT SIGNAL 404
502, 502a, 502b, 502c, 502d, 502e, 502f. ENCODED VIDEO SIGNAL BLOCKS
503, 503a, 503b, 503c, 503d, 503e, 503f. ENCODED VOICE SIGNAL BLOCKS
504, 504a, 504b, 504c, 504d, 504e, 504f. MIDDLE FREQUENCY AREAS
505, 505a, 505b, 505c, 505d, 505e, 505f. LOW FREQUENCY AREAS
506, 506a, 506b, 506c, 506d, 506e, 506f. HIGH FREQUENCY AREAS
601a, 601d. FRAMES WHERE ENCODED VIDEO SIGNAL BLOCKS ARE DECODED
602b, 602c, 602e, 602f. FRAMES WHERE ENCODED VIDEO SIGNAL BLOCKS ARE NOT DECODED BUT DISCARDED
701. SIGNAL RECEIVING CIRCUIT
702. SIGNAL EXTRACTION CIRCUIT
703. VIDEO SIGNAL PROCESSING CIRCUIT
704. VOICE SIGNAL PROCESSING CIRCUIT
705. INPUT SIGNAL
706. ENCODED VIDEO SIGNAL
707. ENCODED VOICE SIGNAL
708. VIDEO SIGNAL
709. VOICE SIGNAL
801a, 801d. FRAMES TO BE DECODED
802d, 802c, 802e, 802f. FRAMES TO BE DISCARDED WITHOUT DECODING
1. SOUND SIGNAL PROCESSING APPARATUS
2. SOUND SIGNAL TRANSMITTING APPARATUS
3. SOUND SIGNAL EXTRACTION CIRCUIT
4. D/A CONVERSION CIRCUIT
5. FR SPEAKER
6. FL SPEAKER
7. SOUND SIGNAL AVERAGING CIRCUIT
8. BIT COUNT REDUCTION CIRCUIT
9a. FR BIT COUNT DEMODULATION CIRCUIT
9b. FL BIT COUNT DEMODULATION CIRCUIT
9c. RR BIT COUNT DEMODULATION CIRCUIT
9d. RL BIT COUNT DEMODULATION CIRCUIT
10. RR SPEAKER
11. RL SPEAKER
12. SAMPLE DELETION CIRCUIT
13a. FR SAMPLE DEMODULATION CIRCUIT
13b. FL SAMPLE DEMODULATION CIRCUIT
13c. RR SAMPLE DEMODULATION CIRCUIT
13d. RL SAMPLE DEMODULATION CIRCUIT
A. REPRODUCED SOUND SIGNAL
B. OUTPUT SOUND SIGNAL
C. FR EXTRACTED SOUND SIGNAL
D. FL EXTRACTED SOUND SIGNAL
C'. FR OUTPUT SOUND SIGNAL
D'. FL OUTPUT SOUND SIGNAL
E. R AVERAGE SOUND SIGNAL
F. L AVERAGE SOUND SIGNAL
E'. R OUTPUT SOUND SIGNAL
F'. L OUTPUT SOUND SIGNAL
G. FR BIT COUNT REDUCED SOUND SIGNAL
H. FL BIT COUNT REDUCED SOUND SIGNAL
J. RR BIT COUNT REDUCED SOUND SIGNAL
M. RL BIT COUNT REDUCED SOUND SIGNAL
Ga. FR ANALOG SOUND SIGNAL
Ha. FL ANALOG SOUND SIGNAL
Ja. RR ANALOG SOUND SIGNAL
Ma. RL ANALOG SOUND SIGNAL
Gb. FR OUTPUT SOUND SIGNAL
Hb. FL OUTPUT SOUND SIGNAL
Jb. RR OUTPUT SOUND SIGNAL
Mb. RL OUTPUT SOUND SIGNAL
X. ANALOG SOUND SIGNAL CORRESPONDING TO PRESCRIBED SOUND MAGNITUDE
N. FR SAMPLE DELETED SOUND SIGNAL
P. FL SAMPLE DELETED SOUND SIGNAL
Q. RR SAMPLE DELETED SOUND SIGNAL
S. RL SAMPLE DELETED SOUND SIGNAL
Na. FR ANALOG SOUND SIGNAL
Pa. FL ANALOG SOUND SIGNAL
Qa. RR ANALOG SOUND SIGNAL
Sa. RL ANALOG SOUND SIGNAL
Nb. FR OUTPUT SOUND SIGNAL
Pb. FL OUTPUT SOUND SIGNAL
Qb. RR OUTPUT SOUND SIGNAL
Sb. RL OUTPUT SOUND SIGNAL

BEST MODE FOR CARRYING OUT THE INVENTION

Embodiments of the present invention will be described below with reference to FIGS. 1 to 6.

Embodiment 1

FIG. 1 is a block diagram showing the general configuration of a video and voice signal processing apparatus according to a first embodiment of the present invention. In FIG. 1, 101 is a signal receiving circuit, 102 is a video signal extraction circuit, 103 is a video signal processing circuit, 104 is a voice signal processing circuit, 105 is an input signal, 106 is an encoded video signal, 107 is an encoded voice signal, 108 is a representative video signal, 109 is a video signal, and 110 is a voice signal. The input signal 105 is a signal that can be divided into units of frames.

The signal receiving circuit 101 recovers the encoded video signal 106 and encoded voice signal 107 from the received input signal 105, and supplies the encoded video signal to the video signal extraction circuit 102 and the encoded voice signal 107 to the voice signal processing circuit 104. The video signal extraction circuit 102 extracts a designated frame (by decimation) from the encoded video signal 106 supplied from the signal receiving circuit 101, and supplies the extracted frame as the representative video signal 108 to the video signal processing circuit 103.

The video signal processing circuit 103 decodes the representative video signal 108 supplied from the video signal extraction circuit 102, and outputs the decoded signal as the video signal 109. The voice signal processing circuit 104 decodes the encoded voice signal 107 supplied from the signal receiving circuit 101, and outputs the decoded signal as the voice signal 110.

At this time, the resolution of the video signal 109 along the time axis degrades as a result of the frame decimation applied to the encoded video signal 106; on the other hand, original voice can be output without degradation since the voice signal 110 is obtained by decoding all of the encoded voice signal 107.

Embodiment 2

Figure 2:
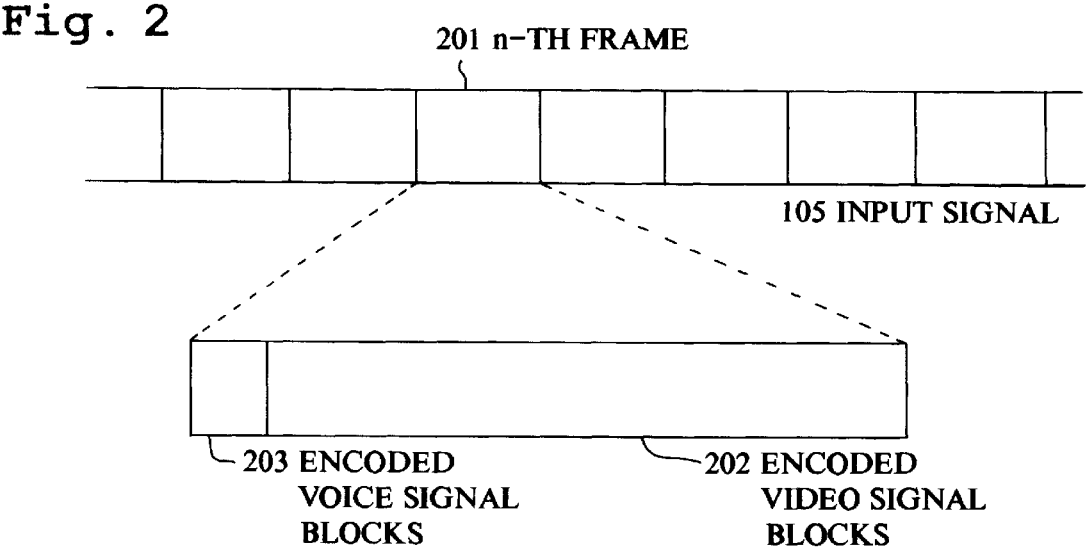
FIG. 2 is an explanatory diagram showing the structure of an input signal according to a second embodiment of the present invention.
Figure 3:
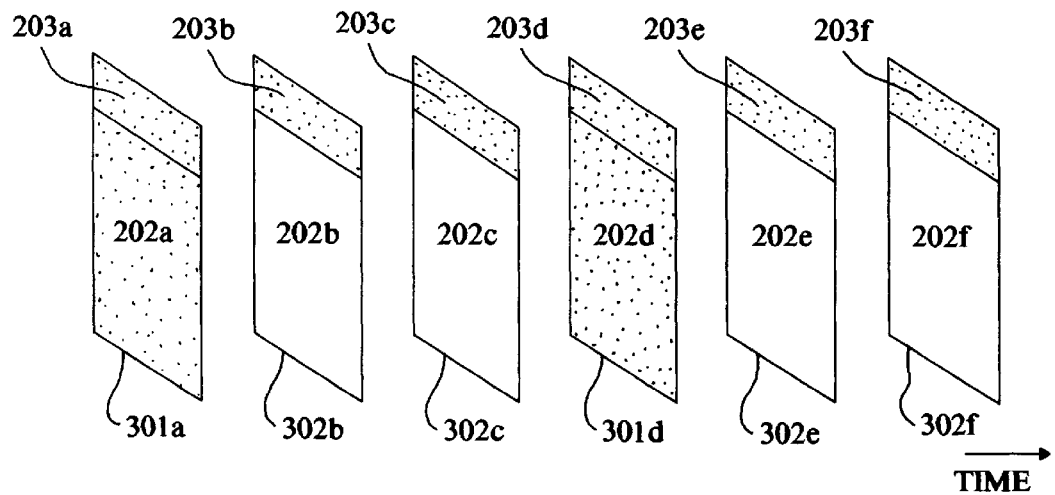
FIG. 3 is an explanatory diagram showing individual frames of the input signal in the second embodiment of the present invention, arranged along the time axis.

A specific example of the input signal 105 to the video and voice signal processing apparatus of the first embodiment will be described as a second embodiment. FIG. 2 is an explanatory diagram showing the structure of the input signal 105 according to the second embodiment. In FIG. 2, 201 is an n-th frame, 202 is an encoded video signal block, and 203 is an encoded voice signal block. The input signal 105 is a signal that can be divided frame by frame, and the frame 201 is one of such frames. FIG. 3 is an explanatory diagram showing the individual frames of the input signal 105 arranged along the time axis. In FIG. 3, 301a and 301d are frames to be decoded from the encoded video signal, and 302b, 302c, 302e, and 302f are frames to be discarded by frame decimation of the encoded video signal. The general configuration of the video and voice signal processing apparatus in this embodiment is the same as that of the first embodiment.

The signal receiving circuit 101 in FIG. 1 receives the input signal 105, and supplies the encoded video signal blocks 202a, 202b, 202c, 202d, 202e, and 202f as the encoded video signal 106 to the video signal extraction circuit 102 and the encoded voice signal blocks 203a, 203b, 203c, 203d, 203e, and 203f as the encoded voice signal 107 to the voice signal processing circuit 104. The video signal extraction circuit 103 extracts the encoded video signals 202a and 202d from the thus supplied encoded video signal 106, and supplies them as the representative video signal 108 to the video signal processing circuit 103. The video signal processing circuit 103 decodes only the representative video signal 108, that is, the encoded video signal blocks 202a and 202d, and outputs the decoded signal as the video signal 109. The voice signal processing circuit 104 decodes the encoded voice signal 107, that is, all of the encoded voice signal blocks 203a, 203b, 203c, 203d, 203e, and 203f, and outputs the decoded signal as the voice signal 110.

In the present embodiment, the input signal 105 shown in FIG. 2 has been described treating one frame as a unit, but it will be appreciated that a plurality of frames may be treated together as a unit or a unit based on fields may be used.

Further, in FIG. 2, the encoded voice signal block 203 is located at the head of the frame 201, but it may be placed at any position within the frame 201 or may be divided over a plurality of regions.

In FIG. 3, the frame decimation of the encoded video signal blocks 202a, 202b, 202c, 202d, 202e, and 202f is performed by discarding two frames out of every three frames, but the frames may be decimated by any suitable factor and the decimation factor need not necessarily be fixed.

Embodiment 3

Figure 4:
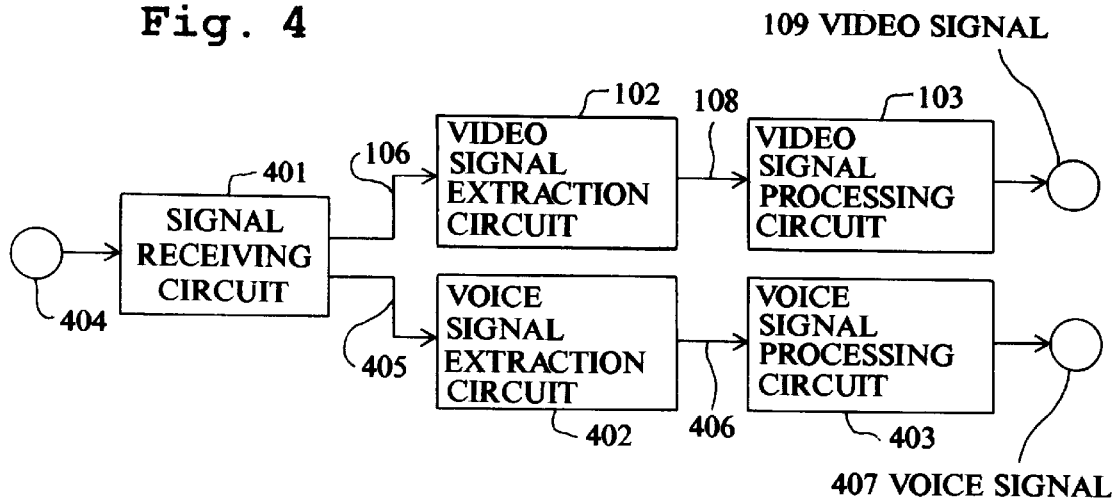
FIG. 4 is a block diagram of a video and voice signal processing apparatus according to a third embodiment of the present invention.

FIG. 4 is a block diagram showing the general configuration of a video and voice signal processing apparatus according to a third embodiment of the present invention. In FIG. 4, the same parts as those in the video and voice signal processing apparatus of FIG. 1 are designated by the same numerals, and detailed explanation of such parts will be omitted.

In FIG. 4, 401 is a signal receiving circuit, 402 is a voice signal extraction circuit, 403 is a voice signal processing circuit, 404 is an input signal, 405 is an encoded voice signal, 406 is a representative voice signal, and 407 is a voice signal. The signal receiving circuit 401 recovers the encoded video signal 106 and encoded voice signal 405 from the received input signal 404, and supplies the encoded video signal 106 to the video signal extraction circuit 102 and the encoded voice signal 405 to the voice signal extraction circuit 402. The voice signal extraction circuit 402 extracts representative information frame by frame from the encoded voice signal 405 supplied from the signal receiving circuit 401, and supplies the extracted information as the representative voice signal 406 to the voice signal processing circuit 403. The voice signal processing circuit 403 decodes the representative voice signal 406 supplied from the voice signal extraction circuit 402, and outputs the decoded signal as the voice signal 407.

The voice signal 407 at this time is produced by decoding the representative information of every frame carried in the input encoded voice signal 405. Since no discontinuities occur in the reproduced voice, the voice signal thus output is recognizable as voice, though the sound quality degrades.

Embodiment 4

Figure 5:
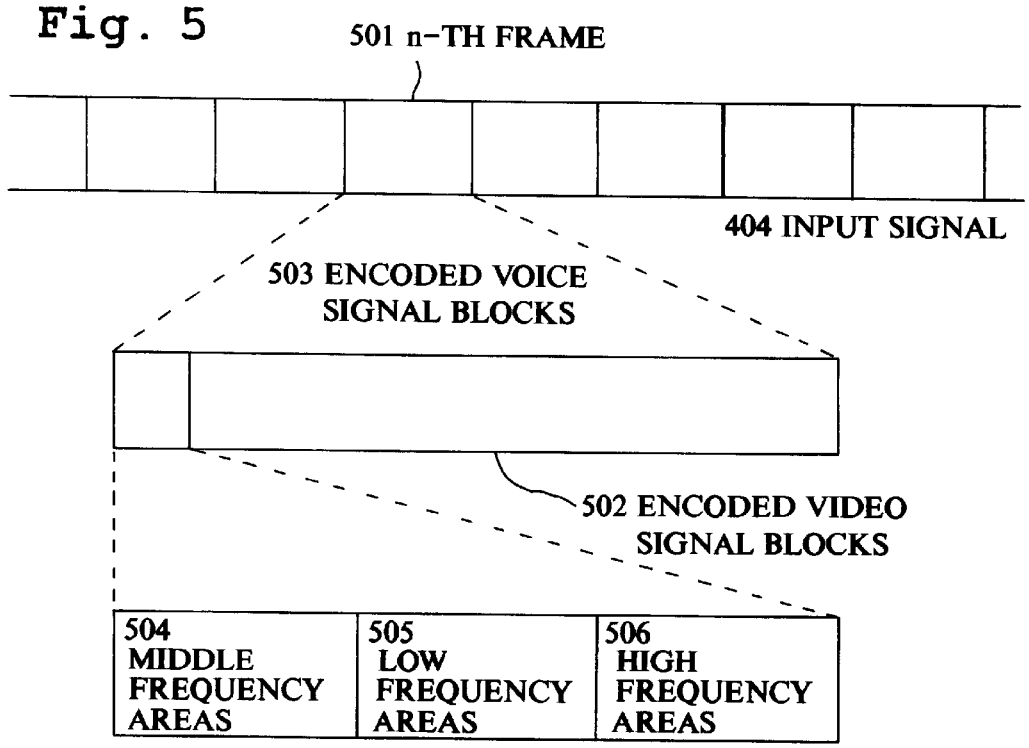
FIG. 5 is an explanatory diagram showing the structure of an input signal according to a fourth embodiment of the present invention.

A specific example of the input signal 404 to the video and voice signal processing apparatus of the third embodiment will be described as a fourth embodiment. FIG. 5 is an explanatory diagram showing the structure of the input signal 404 according to the fourth embodiment. In FIG. 5, 501 is an n-th frame, 502 is an encoded video signal block, 503 is an encoded voice signal block, 504 is a middle frequency area of the encoded voice signal block 503, 505 is a low frequency area of the encoded voice signal block 503, and 506 is a high frequency area of the encoded voice signal block 503. The input signal 404 is a signal that can be divided frame by frame, and the frame 501 is one of such frames.

Figure 6:
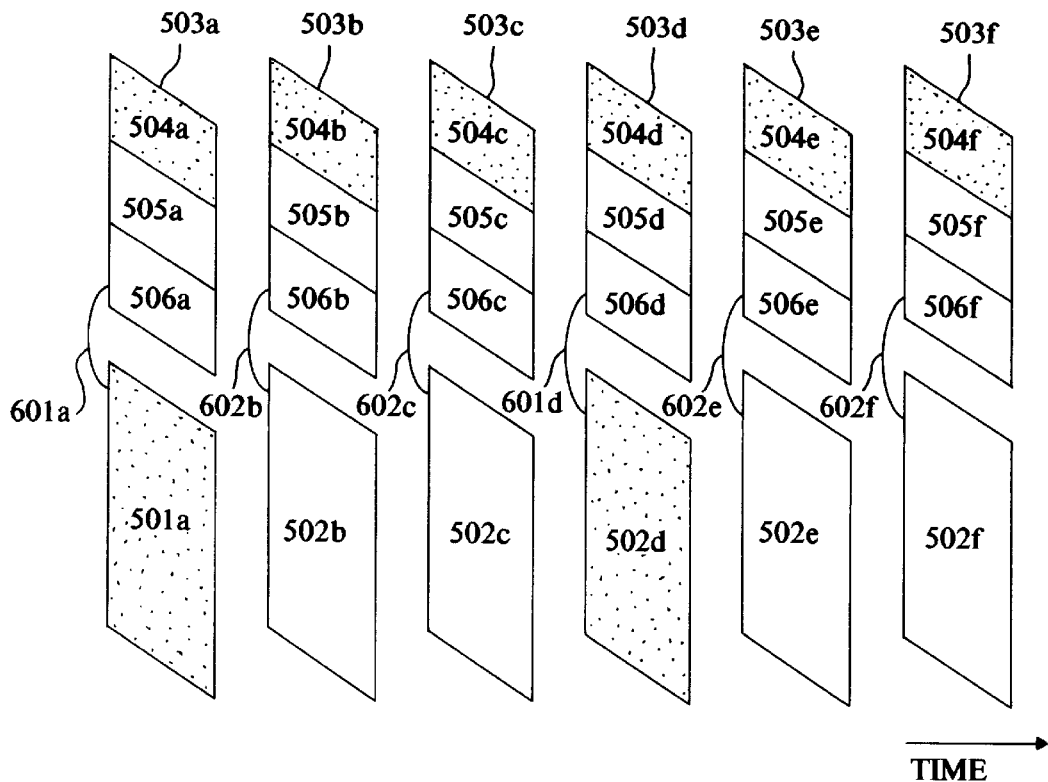
FIG. 6 is an explanatory diagram showing individual frames of the input signal in the fourth embodiment of the present invention, arranged along the time axis.
Figure 7:
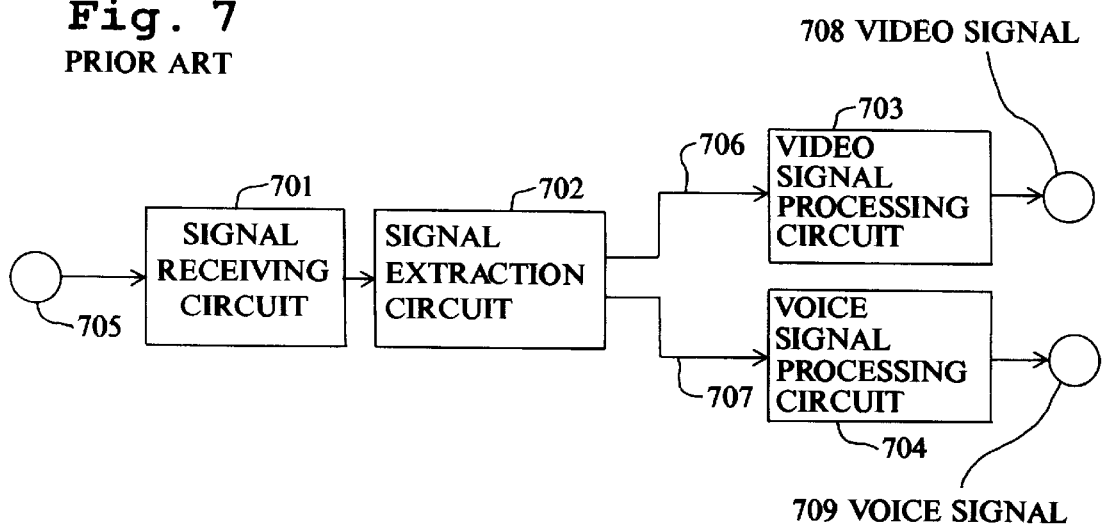
FIG. 7 is a block diagram showing the configuration of a video and voice signal processing apparatus according to the prior art.

FIG. 6 is an explanatory diagram showing the individual frames of the input signal 404 arranged along the time axis. In FIG. 6, 601a and 601d are frames to be decoded from the encoded video signal, and 602b, 602c, 602e, and 602f are frames to be discarded by frame decimation of the encoded video signal. The general configuration of the video and voice signal processing apparatus in this embodiment is the same as that of the third embodiment.

The signal receiving circuit 401 in FIG. 5 receives the input signal 404, and supplies the encoded video signal blocks 502a, 502b, 502c, 502d, 502e, and 502f as the encoded video signal 106 to the video signal extraction circuit 102 and the encoded voice signal blocks 503a, 503b, 503c, 503d, 503e, and 503f as the encoded voice signal 405 to the voice signal extraction circuit 402. The video signal extraction circuit 103 extracts the encoded video signals 502a and 502d from the thus supplied encoded video signal 106, and supplies them as the representative video signal 108 to the video signal processing circuit 103. The voice signal extraction circuit 402 extracts the middle frequency areas 504a, 504b, 504c, 504d, 504e, and 504f from the encoded voice signal 405, that is, from the encoded voice signal blocks 503a, 503b, 503c, 503d, 503e, and 503f, and outputs them as the representative voice signal 406. The voice signal processing circuit 403 decodes the representative voice signal 406 supplied from the voice signal extraction circuit 402, and outputs the decoded signal as the voice signal 407.

The voice signal 407 at this time is produced by decoding the middle frequency components of the input encoded voice signal 405 over all the frames. Therefore, the voice signal band becomes narrower and the sound quality degrades, but since no discontinuities occur in the reproduced voice, the voice signal thus output is recognizable as voice.

In the present embodiment, the input signal 404 shown in FIG. 5 has been described treating one frame as a unit, but it will be appreciated that a plurality of frames may be treated together as a unit or a unit based on blocks may be used.

Further, in FIG. 5, the encoded voice signal block 503 is located at the head of the frame 501, but it may be placed at any position within the frame 501 or may be divided over a plurality of regions.

In FIG. 3, the frame decimation of the encoded video signal blocks 202a, 202b, 202c, 202d, 202e, and 202f is performed by discarding two frames out of every three frames, but the frames may be decimated by any suitable factor and the decimation factor need not necessarily be fixed.

Further, in FIG. 5, the encoded voice signal block 503 is divided into three areas, i.e., the middle frequency area 504, the low frequency area 505, and the high frequency area 506, and of these areas, only the middle frequency area 504 is extracted and output as the representative voice signal 406; alternatively, it may be divided into n areas, and m areas, where $n \geq m \geq 1$, may be extracted and output as the representative voice signal 406.

As described above, according to the present invention, the resolution of the output video signal along the time axis degrades as a result of the frame decimation applied to the encoded video signal 106 in the input signal; on the other hand, the original voice signal can be output since all of the encoded voice signal is decoded.

Further, according to the present invention, since only representative information is extracted from each frame of the encoded voice signal and decoded for every frame, sound quality degrades but uninterrupted and intelligible voice can be output.

Embodiment 5

The configuration of a sound signal processing apparatus according to a fifth embodiment of the present invention will be described first.

Figure 10:
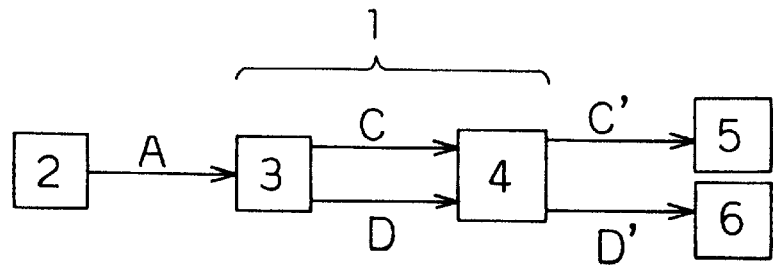
FIG. 10 is a block diagram of a sound signal processing apparatus according to a fifth embodiment.

FIG. 10 shows a block diagram of the sound signal processing apparatus according to the fifth embodiment. Numeral 1 is the sound signal processing apparatus, 2 is a sound signal transmitting apparatus, 3 is a sound signal extraction circuit, 4 is a D/A conversion circuit, 5 is an FR speaker, 6 is an FL speaker, A is a reproduced sound signal, C is an FR extracted sound signal, D is an FL extracted signal, C' is an FR output sound signal, and D' is an FL output sound signal.

The sound signal processing apparatus 1 consists of the sound signal extraction circuit 3 and the D/A conversion circuit 4. The sound signal transmitting apparatus 2 is an apparatus, for example, for playing back a compact disc on which sound is recorded using digital sound signals, and is a means for generating the reproduced sound signal A of a digital sound signal and outputting it to the sound signal extraction circuit 3. The reproduced sound signal A will be explained later with reference to FIGS. 11 and 12. The sound signal extraction circuit 3 is a means for taking as an input the reproduced sound signal A from the sound signal transmitting apparatus 2, and for generating from the reproduced sound signal A the FR extracted sound signal C and the FL extracted sound signal D for output to the D/A conversion circuit 4. The FR extracted sound signal C and the FL extracted sound signal D will be explained later with reference to FIG. 13. The D/A conversion circuit 4 is a means for taking as inputs the FR extracted sound signal C and the FL extracted sound signal D from the sound signal extraction circuit 3, and for converting these digital sound signals into analog sound signals, outputting the FR output sound signal C', the FR extracted sound signal C converted into an analog sound signal, to the FR speaker 5 and likewise the FL output sound signal D', the FL extracted sound signal D converted into an analog sound signal, to the FL speaker 6. The FR speaker 5 is a means for taking as an input the FR output sound signal C' from the D/A conversion circuit 4, and for reproducing the sound corresponding to that sound signal. Likewise, the FL speaker 6 is a means for taking as an input the FL output sound signal D' from the D/A conversion circuit 4, and for reproducing the sound corresponding to that sound signal.

Figure 11:
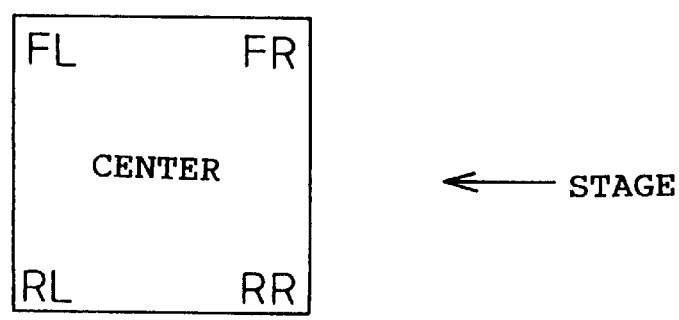
FIG. 11 is a schematic diagram showing a stage and its four corners.

Next, an explanation will be given of the reproduced sound signal A. First, the four corners of a stage are defined as FR, FL, RR, and RL, respectively, as shown in FIG. 11. Next, four sounds independently recorded at the above-defined four corners when music is played at the center of the stage are defined as AFR, AFL, ARR, and ARL, respectively. Further, the sound AFR is converted into digital sound signals, which are then grouped according to a prescribed unit of time; the signals thus grouped according to the prescribed unit of time are defined as digital signal units FR1, FR2, FR3, and so on. Likewise, the sound AFL, the sound ARR, and the sound ARL are each converted into digital sound signals, which are then grouped according to the prescribed unit of time; the signals thus grouped according to the prescribed unit of time are defined as digital signal units FL1, FL2, FL3, . . . , RR1, RR2, RR3, . . . , or RL1, RL2, RL3, . . . , respectively. At this time, the digital signal units FR1, FR2, FR3, . . . are labeled and numbered so that when they are arranged in the order of FR1, FR2, FR3, . . . , and sound is reproduced from them, the sound AFR recorded at the corner FR is reproduced. Likewise, the digital signal units FL1, FL2, FL3, . . . , RR1, RR2, RR3, . . . , and RL1, RL2, RL3, . . . , respectively, are labeled and numbered so that when they are arranged in the order of FL1, FL2, FL3, . . . , RR1, RR2, RR3, . . . , or RL1, RL2, RL3, . . . , and sound is reproduced from them, the sound AFL, ARR, or ARL recorded at the corner FL, RR, or RL is reproduced. Here, we use the convention that the digital signal units FR1, FL1, RR1, and RL1 are sound signals recording the played music at the same instant in time, and likewise, the digital signal units FR2, FL2, RR2, and RL2 are sound signals recording the same music at the same instant in time. That is, the digital signal units with the same number are sound signals recording the played music at the same instant in time. Based on this convention, the structure of the reproduced sound signal A is shown in FIG. 12. As shown in FIG. 12, the reproduced sound signal A is a composite digital sound signal consisting of the above-described digital signal units, FR1, FR2, FR3, ..., FL1, FL2, FL3, ..., RR1, RR2, RR3, ..., and RL1, RL2, RL3, ..., arranged in the order of FR1, FL1, RR1, RL1, FR2, FL2, RR2, RL2, FR3, FL3, RR3, RL3, and so on. More specifically, the reproduced sound signal A is a composite digital sound signal consisting of the digital sound signals corresponding to the four channel sounds recorded at the four corners FR, FL, RR, and RL of the stage, and when all the four channel sounds of the reproduced sound signal A are reproduced, four-channel stereo music is generated.

FIG. 13(a) shows the structure of the FR extracted sound signal C. FR1, FR2, FR3, FR4, ... are digital signal units forming part of the reproduced sound signal A, as described above. The FR extracted sound signal C is a digital sound signal which, of the digital signal units constituting the reproduced sound signal A, consists of the digital signal units FR1, FR2, FR3, FR4, ..., generated from the sound recorded at the corner FR of the stage and arranged in the order of FR1, FR2, FR3, FR4, .... Likewise, the FL extracted sound signal D is a digital sound signal which, of the digital signal units constituting the reproduced sound signal A, consists of the digital signal units FL1, FL2, FL3, FL4, ..., generated from the sound recorded at the corner FL of the stage and arranged in the order of FL1, FL2, FL3, FL4, ..., as shown in FIG. 13(b).

Here, the sound signal extraction circuit 3 has been used as the extracting means of the present invention and the D/A conversion circuit 4 as the signal converting means.

Next, the operation of the thus configured sound signal processing apparatus 1 of the fifth embodiment of the present invention will be described.

First, the sound signal transmitting apparatus 2 generates the reproduced sound signal A consisting of the digital signal units FR1, FL1, RR1, RL1, FR2, FL2, RR2, RL2, FR3, ..., as described above, and outputs it to the sound signal extraction circuit 3.

Then, the sound signal extraction circuit 3 extracts FR1, FR2, FR3, FR4, ... from the reproduced sound signal A input from the sound signal transmitting apparatus 2, and arranges them in the order of FR1, FR2, FR3, FR4, ..., thus generating the FR extracted sound signal C of the digital sound signal corresponding to the sound recorded at the corner FR of the stage, and outputting it to the D/A conversion circuit 4. Likewise, the sound signal extraction circuit 3 extracts FL1, FL2, FL3, FL4, ... from the input reproduced sound signal A, and arranges them in the order of FL1, FL2, FL3, FL4, ..., thus generating the FL extracted sound signal D of the digital sound signal corresponding to the sound recorded at the corner FL of the stage, and outputting it to the D/A conversion circuit 4.

Further, the D/A conversion circuit 4 takes as inputs the FR extracted sound signal C and the FL extracted sound signal D from the sound signal extraction circuit 3, and converts the FR extracted sound signal C into the FR output sound signal C', an analog sound signal, which is output to the FR speaker 5. Likewise, the D/A conversion circuit 4 converts the input FL extracted sound signal D into the FL output sound signal D', an analog sound signal, which is output to the FL speaker 6. Since the D/A conversion circuit 4 converts the digital sound signals corresponding to the two channel sounds recorded at the corners FR and FL of the stage into analog sound signals, its burden is reduced by half as compared with the case if the digital sound signals corresponding to the four channel sounds recorded at the corners FR, FL, RR, and RL of the stage were converted into analog sound signals.

Finally, the FR speaker 5 receives the FR output sound signal C' from the D/A conversion circuit 4, and reproduces the sound recorded at the corner FR of the stage. Likewise, the FL speaker 6 receives the FL output sound signal D' from the D/A conversion circuit 4, and reproduces the sound recorded at the corner FL of the stage.

In the fifth embodiment, the sound signal extraction circuit 3 has been described as generating from the reproduced sound signal A the FR extracted sound signal C of the digital sound signal corresponding to the sound recorded at the corner FR of the stage and the FL extracted sound signal D of the digital sound signal corresponding to the sound recorded at the corner FL of the stage; alternatively, the sound signal extraction circuit 3 may be configured to generate from the reproduced sound signal A the digital sound signal corresponding to the sound recorded at the corner RR of the stage and the digital sound signal corresponding to the sound recorded at the corner RL of the stage. The only requirement is that the sound signal extraction circuit 3 should be configured to generate digital sound signals of a prescribed number of channels equal to or less than 3 out of the four channel digital sound signals constituting the reproduced sound signal A. In this case, the D/A conversion circuit 4 need only convert the digital sound signals output from the sound signal extraction circuit 3 into analog sound signals and output them to designated speakers, and the designated speakers to which the analog sound signals are input need only reproduce the sounds corresponding to the input analog sound signals.

Further, in the fifth embodiment, the sound signal extraction circuit 3 has been described as generating the FR extracted sound signal C and the FL extracted sound signal D from the reproduced sound signal A; alternatively, the sound signal extraction circuit 3 may be configured to take an extraction signal as an input and to generate, based on the extraction signal, digital sound signals of a prescribed number of channels equal to or less than 3 from the four-channel composite digital sound signal constituting the reproduced sound signal A.

Embodiment 6

The configuration of a sound signal processing apparatus according to a sixth embodiment of the present invention will be described first.

FIG. 14 shows a block diagram of the sound signal processing apparatus according to the sixth embodiment. Numeral 1 is the sound signal processing apparatus, 2 is a sound signal transmitting apparatus, 7 is a sound signal averaging circuit, 4 is a D/A conversion circuit, 5 is an FR speaker, 6 is an FL speaker, A is a reproduced sound signal, E is an R average sound signal, F is an L average sound signal, E' is an R output sound signal, and F' is an L output sound signal.

Figure 8:
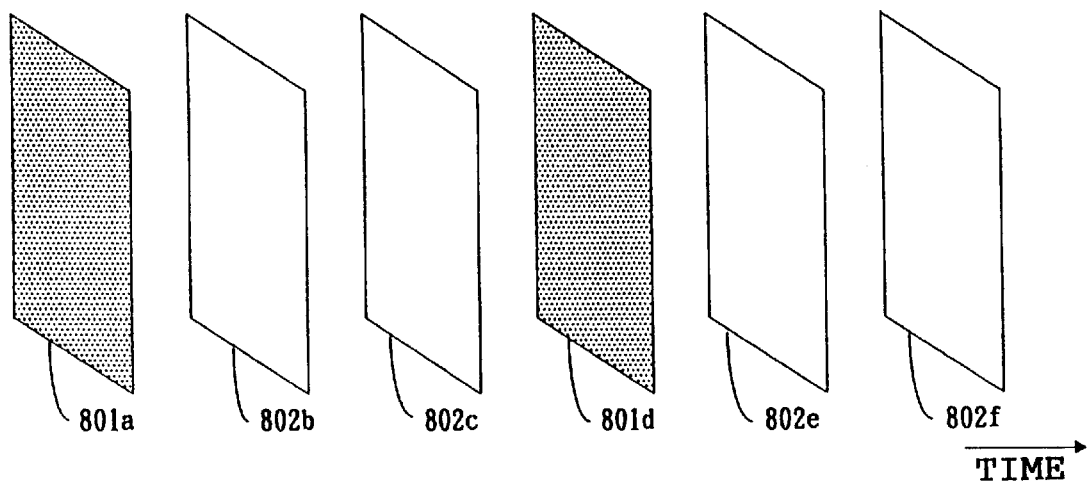
FIG. 8 is an explanatory diagram showing individual frames of an input signal in the prior art, arranged along the time axis.
Figure 9:
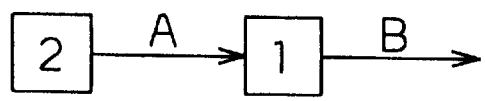
FIG. 9 is a block diagram of a prior art sound signal processing apparatus.

The sound signal processing apparatus 1 consists of the sound signal averaging circuit 7 and the D/A conversion circuit 4. The sound signal transmitting apparatus 2 is a means for generating the reproduced sound signal A explained in the fifth embodiment, and for outputting it to the sound signal averaging circuit 7. The reproduced sound signal A will be explained later in further detail with reference to FIG. 15. The sound signal averaging circuit 7 is a means for taking as an input the reproduced sound signal A from the sound signal transmitting apparatus 2, and for generating from the reproduced sound signal A the R average sound signal E and the L average sound signal F for output to the D/A conversion circuit 4. The R average sound signal E and the L average sound signal F will be explained later with reference to FIGS. 15, 8, and 9, together with the operation of the sound signal processing apparatus 1. The D/A conversion circuit 4 is a means for taking as inputs the R average sound signal E and the L average sound signal F output from the sound signal averaging circuit 7, and for converting these digital sound signals into analog sound signals, outputting the R output sound signal E', the R average sound signal E converted into an analog sound signal, to the FR speaker 5 and likewise the L output sound signal F', the L average sound signal F converted into an analog sound signal, to the FL speaker 6. The FR speaker 5 is a means for taking as an input the R output sound signal E' from the D/A conversion circuit 4, and for reproducing the sound corresponding to that sound signal. Likewise, the FL speaker 6 is a means for taking as an input the L output sound signal F' from the D/A conversion circuit 4, and for reproducing the sound corresponding to that sound signal.

FIG. 15 shows the structure of the reproduced sound signal A. FR1, FL1, RR1, RL1, FR2, FL2, RR2, RL2, FR3, . . . , are the digital signal units explained in the fifth embodiment. As explained in the fifth embodiment, the reproduced sound signal A is a composite digital sound signal consisting of digital sound signals corresponding to the four channel sounds; the reproduced sound signal A here consists of samples. Here, fr101, fr102, . . . , fr110 are samples grouped into FR1, and likewise, rr101, rr102, . . . , rr110 are samples grouped into RR1; these samples are digital sound signals. The samples are labeled and numbered so that the samples fr101, fr102, . . . , fr110 constitute the digital signal unit FR1 by being arranged in the order of fr101, fr102, . . . , fr110, and likewise, the samples rr101, rr102, . . . , rr110 constitute the digital signal unit RR1 by being arranged in the order of rr101, rr102, . . . , rr110. Here, we use the convention that the samples fr101 and rr101 are signals in FR1 and RR1 at the same sampling instant, and likewise, the samples fr102 and rr102, . . . , fr110 and rr110 are signals in FR1 and RR1 at the same sampling instants, respectively. In this manner, the digital signal units FR1 and RR1 each consist of 10 samples which are arranged in ascending order of the appended numbers, the same number representing the samples taken at the same sampling instant from the played music; likewise, the digital signal units FL1 and RL1 each consist of 10 samples which are numbered consecutively in ascending order of numbers and arranged in ascending order of the appended numbers, the same number representing the samples taken at the same sampling instant from the same music. Also, the digital signal units FR2, FL2, RR2, and RL2 each consist of 10 samples which are numbered consecutively in ascending order of numbers and arranged in ascending order of the appended numbers, the same number representing the samples taken at the same sampling instant from the same music. In this way, we use the convention that the digital signal units labeled with the same number each consist of 10 samples which are numbered consecutively in ascending order of numbers and arranged in ascending order of the appended numbers, the same number representing the samples taken at the same sampling instant from the played music.

Here, the sound signal averaging circuit 7 has been used as the averaging means of the present invention and the D/A conversion circuit 4 as the signal converting means.

Next, the operation of the thus configured sound signal processing apparatus 1 of the sixth embodiment of the present invention will be described.

First, the sound signal transmitting apparatus 2 generates the reproduced sound signal A and outputs it to the sound signal averaging circuit 7.

Figure 16:
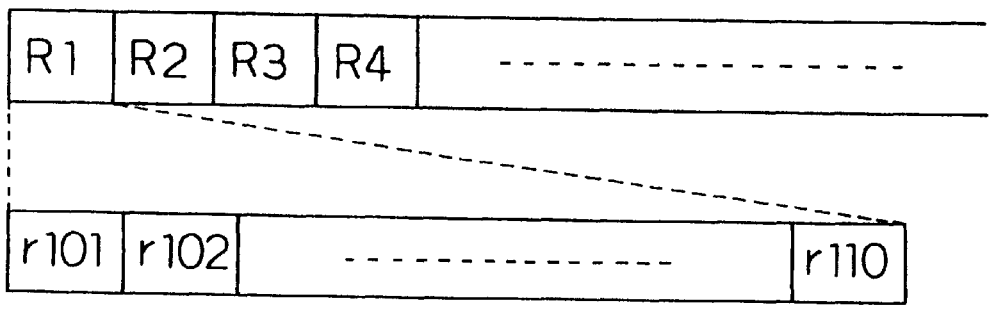
FIG. 16 is a structural diagram of an R average sound signal E in the sixth embodiment of the present invention.
Figure 17:
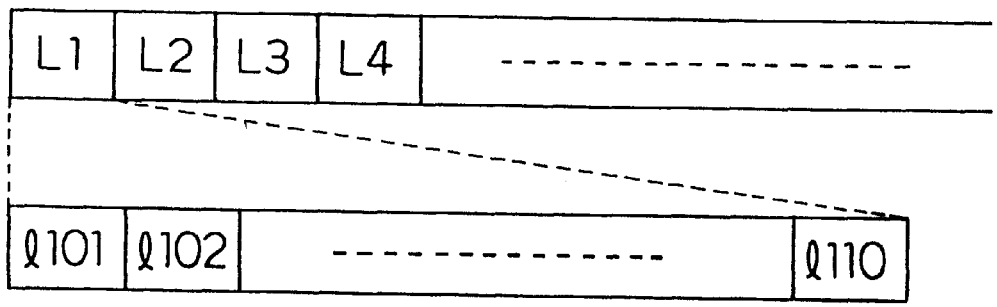
FIG. 17 is a structural diagram of an L average sound signal F in the sixth embodiment of the present invention.

Then, the sound signal averaging circuit 7 receives the reproduced sound signal A from the sound signal transmitting apparatus 2, and generates the R average sound signal E, such as shown in FIG. 16, using FR1, FR2, FR2, . . . and RR1, RR2, RR3, . . . out of the digital signal units constituting the reproduced sound signal A, and the L average sound signal F, such as shown in FIG. 17, using FL1, FL2, FL3, . . . and RL1, RL2, RL3, . . . . That is, out of the reproduced sound signal A, the sound signal averaging circuit 7 generates the R average sound signal E from the digital sound signal corresponding to the sound recorded at the corner FR of the stage and the digital sound signal corresponding to the sound recorded at the corner RR, and the L average sound signal F from the digital sound signal corresponding to the sound recorded at the corner FL of the stage and the digital sound signal corresponding to the sound recorded at the corner RL.

Now, the R average sound signal E will be explained in detail. FIG. 16 shows the structure of the R average sound signal E. Here, r101 is a digital sound signal having a digital value equivalent to the average value taken between the digital value of the sample fr101 in the digital signal unit FR1 and the digital value of the sample rr101 in the digital signal unit RR1, FR1 and RR1 constituting part of the reproduced sound signal A explained with reference to FIG. 15. For example, if the digital values of the samples fr101 and rr101 are 771 and 797, respectively, then r101 is a digital sound signal having a digital value of 784. Likewise, r102, . . . , r110 are digital sound signals having digital values equivalent to the average values taken between the digital values of the samples fr102, . . . , fr110 in the digital signal unit FR1 and the digital values of the samples rr102, . . . , rr110 in the digital signal unit RR1, respectively, i.e., between the digital values of the same numbered samples taken at the same sampling instant. Next, R1 is a digital signal unit consisting of r101, r102, . . . , r110 arranged in the order of r101, r102, . . . , r110. R2, R3, R4, . . . , similarly to the digital signal unit R1, are digital signal units obtained by averaging the digital values of the signals sampled at the same sampling instants between the digital signal units FR2, FR3, FR4, . . . and RR2, RR3, RR4, . . . , respectively, and by arranging the digital sound signals having such average values in the order corresponding to the order in which the samples before averaging were arranged; these digital signal units R2, R3, R4, . . . are labeled and numbered in corresponding relationship to the digital signal units FR2, FR3, FR4, . . . and RR2, RR3, RR4, . . . , respectively. The digital sound signal with R1, R2, R3, . . . arranged in the order of R1, R2, R3, . . . , constitutes the R average sound signal E. That is, the R average sound signal E is a digital sound signal corresponding to the sound representing the average of the sounds recorded at the corners FR and RR of the stage.

The L average sound signal F will be explained in like manner. FIG. 17 shows the structure of the L average sound signal F. Here, l101, like r101, is a digital sound signal having a digital value equivalent to the average value taken between the digital value of the sample fl101 in the digital signal unit FL1 and the digital value of the sample rl101 in the digital signal unit RL1; likewise, l102, . . . , l110 are digital sound signals having digital values equivalent to the average values taken between the digital values of the samples fl102, . . . , fl110 in the digital signal unit FL1 and the digital values of the samples rl102, . . . , rl110 in the digital signal unit RL1, respectively, i.e., between the digital values of the same numbered samples taken at the same sampling instant. Next, L1, like R1, is a digital signal unit consisting of l101, l102, ..., l110 arranged in the order of l101, l102, ..., l110. L2, L3, L4, ..., similarly to the digital signal unit L1, are digital signal units obtained by averaging the digital values of the signals sampled at the same sampling instants between the digital signal units FL2, FL3, FL4, ... and RL2, RL3, RL4, ..., respectively, and by arranging the digital sound signals having such average values in the order corresponding to the order in which the samples before averaging were arranged; these digital signal units L2, L3, L4, ... are labeled and numbered in corresponding relationship to the digital signal units FL2, FL3, FL4, ... and RL2, RL3, RL4, ..., respectively. The digital sound signal with L1, L2, L3, ... arranged in the order of L1, L2, L3, ..., constitutes the L average sound signal F. That is, the L average sound signal F is a digital sound signal corresponding to the sound representing the average of the sounds recorded at the corners FL and RL of the stage.

After that, the sound signal averaging circuit 7 supplies the R average sound signal E and the L average sound signal F to the D/A conversion circuit 4.

Further, the D/A conversion circuit 4 takes as inputs the R average sound signal E and the L average sound signal F from the sound signal averaging circuit 7, and converts the R average sound signal E into the R output sound signal E', an analog sound signal, which is output to the FR speaker 5. Likewise, the D/A conversion circuit 4 converts the input L average sound signal F into the L output sound signal F', an analog sound signal, which is output to the FL speaker 6. Here, since the D/A conversion circuit 4, like the D/A conversion circuit 4 in the fifth embodiment, converts the digital sound signals corresponding to two channel sounds into analog sound signals, its burden is reduced by half as compared with the case if the digital sound signals corresponding to the four channel sounds were converted into analog sound signals.

Finally, the FR speaker 5 receives the R output sound signal E' from the D/A conversion circuit 4, and reproduces the sound representing the average between the sounds recorded at the corners FR and RR of the stage. Likewise, the FL speaker 6 receives the L output sound signal F' from the D/A conversion circuit 4, and reproduces the sound representing the average between the sounds recorded at the corners FL and RL of the stage.

In the sixth embodiment, the sound signal averaging circuit 7 has been described as generating the R average sound signal E from the digital sound signal corresponding to the sound recorded at the corner FR of the stage and the digital sound signal corresponding to the sound recorded at the corner RR, out of the reproduced sound signal A, and also generating the L average sound signal F from the digital sound signal corresponding to the sound recorded at the corner FL of the stage and the digital sound signal corresponding to the sound recorded at the corner RL; alternatively, the sound signal averaging circuit 7 may be configured to generate one average sound signal from the digital sound signal corresponding to the sound recorded at the corner FR of the stage and the digital sound signal corresponding to the sound recorded at the corner FL, and another average sound signal from the digital sound signal corresponding to the sound recorded at the corner RR of the stage and the digital sound signal corresponding to the sound recorded at the corner RL. The only requirement is that the sound signal averaging circuit 7 should be configured to generate a smaller number of average sound signals than four, three, or two from four, three, or two channel sounds of the four channel digital sound signals of the reproduced sound signal A. In this case, the D/A conversion circuit 4 need only convert the digital sound signals output from the sound signal averaging circuit 7 into analog sound signals and output them to designated speakers, and the designated speakers to which the analog sound signals are input need only reproduce the sounds corresponding to the input analog sound signals.

Further, in the sixth embodiment, the sound signal averaging circuit 7 has been described as generating the R average sound signal E from the digital sound signal corresponding to the sound recorded at the corner FR of the stage and the digital sound signal corresponding to the sound recorded at the corner RR, out of the reproduced sound signal A, and also generating the L average sound signal F from the digital sound signal corresponding to the sound recorded at the corner FL of the stage and the digital sound signal corresponding to the sound recorded at the corner RL; alternatively, the sound signal averaging circuit 7 may be configured to take an averaging signal as an input and to generate, based on the averaging signal, a smaller number of average sound signals than four, three, or two from four, three, or two channel digital sound signals out of the four channel digital sound signals constituting the reproduced sound signal A.

Embodiment 7

The configuration of a sound signal processing apparatus according to a seventh embodiment of the present invention will be described first.

FIG. 18 is a block diagram of the sound signal processing apparatus according to the seventh embodiment. Numeral 1 is the sound signal processing apparatus, 2 is a sound signal transmitting apparatus, 8 is a bit count reduction circuit, 4 is a D/A conversion circuit, 9a is an FR bit count demodulation circuit, 9b is an FL bit count demodulation circuit, 9c is an RR bit count demodulation circuit, 9d is an RL bit count demodulation circuit, 5 is an FR speaker, 6 is an FL speaker, 10 is an RR speaker, 11 is an RL speaker, A is a reproduced sound signal, G is an FR bit count reduced sound signal, H is an FL bit count reduced sound signal, J is an RR bit count reduced sound signal, M is an RL bit count reduced sound signal, Ga is an FR analog sound signal, Ha is an FL analog sound signal, Ja is an RR analog sound signal, Ma is an RL analog sound signal, Gb is an FR output sound signal, Hb is an FL output sound signal, Jb is an RR output sound signal, and Mb is an RL output sound signal.

The sound signal processing apparatus 1 consists of the bit count reduction circuit 8 and the D/A conversion circuit 4. The sound signal transmitting apparatus 2 is a means for generating the reproduced sound signal A, and for supplying it to the bit count reduction circuit 8. The reproduced sound signal A is a digital sound signal consisting of samples such as explained in the sixth embodiment. Each sample is a digital sound signal quantized and expressed by 16 bits. The bit count reduction circuit 8 is a means for taking as an input the reproduced sound signal A from the sound signal transmitting apparatus 2, and for generating the FR bit count reduced sound signal G, the FL bit count reduced sound signal H, the RR bit count reduced sound signal J, and the RL bit count reduced sound signal M, for output to the D/A conversion circuit 4, by extracting the high-order eight bits from the 16-bit digital signal of each of the samples constituting the reproduced sound signal A. The FR bit count reduced sound signal G will be explained later with reference to FIG. 19, together with the operation of the sound signal processing apparatus 1. Further, the FL bit count reduced sound signal H, the RR bit count reduced sound signal J, and the RL bit count reduced sound signal M will also be explained with reference to the FR bit count reduced sound signal G. The D/A conversion circuit 4 is a means for taking as inputs the FR bit count reduced sound signal G, FL bit count reduced sound signal H, RR bit count reduced sound signal J, and RL bit count reduced sound signal M from the bit count reduction circuit 8, and for converting these digital sound signals into analog sound signals, outputting the FR analog sound signal Ga, the FR bit count reduced sound signal G converted into an analog sound signal, to the FR bit count demodulation circuit 9*a*, and likewise outputting the FL analog sound signal Ha, RR analog sound signal Ja, and RL analog sound signal Ma, which are the FL bit count reduced sound signal H, RR bit count reduced sound signal J, and RL bit count reduced sound signal M respectively converted into analog signals, to the FL bit count demodulation circuit 9*b*, the RR bit count demodulation circuit 9*c*, and the RL bit count demodulation circuit 9*d*, respectively. The FR bit count demodulation circuit 9*a* is a means for taking as an input the FR analog sound signal Ga output from the D/A conversion circuit 4. Here, all the samples constituting the FR bit count reduced sound signal G, on which the analog sound signal Ga is based, are 8-bit digital sound signals, and the FR bit count reduced signal G is generated by extracting the high-order eight bits of each of the corresponding samples of 16-bit digital sound signals constituting the reproduced sound signal A; therefore, the FR bit count demodulation circuit 9*a* is a means for adding an analog sound signal X corresponding to a prescribed sound magnitude uniformly to the entire FR analog sound signal Ga, thereby generating the FR output sound signal Gb, an analog sound signal corresponding to the sound substantially equal in magnitude to the sound recorded at the FR corner of the stage, and for outputting the FR output sound signal Gb to the FR speaker 5. Likewise, the FL bit count demodulation circuit 9*b*, the RR bit count demodulation circuit 9*c*, and the RL bit count demodulation circuit 9*d* are each a means for taking as an input the FL analog sound signal Ha, RR analog sound signal Ja, or RL analog sound signal Ma from the D/A conversion circuit 4, and for adding the analog sound signal X corresponding to the prescribed sound magnitude uniformly to the entire analog sound signal, thereby generating the FL output sound signal Hb, RR output sound signal Jb, or RL output sound signal Mb, an analog signal corresponding to sound substantially equal in magnitude to the sound recorded at the corner FL, RR, or RL of the stage, and outputting it to the FL speaker 6, RR speaker 10, or RL speaker 11, respectively. The FR output sound signal Gb will be explained later with reference to FIG. 20, together with the operation of the sound signal processing apparatus 1. Further, the FL output sound signal Hb, the RR output sound signal Jb, and the RL output sound signal M will also be explained with reference to the FR output sound signal Gb. The FR speaker 5 is a means for taking as an input the FR output sound signal Gb from the FR bit count demodulation circuit 9*a*, and for reproducing sound substantially equivalent to the sound recorded at the corner FR of the stage. Likewise, the FR speaker 6, the RR speaker 10, and the RL speaker 11 are each a means for taking as an input the FL output sound signal Hb, RR output sound signal Jb, or RL output sound signal Mb from the FL bit count demodulation circuit 9*b*, RR bit count demodulation circuit 9*c*, or RL bit count demodulation circuit 9*d*, respectively, and for reproducing the sound substantially equivalent to the sound recorded at the corner FL, RR, or RL of the stage.

Here, the bit count reduction circuit 8 has been used as the bit count reducing means of the present invention and the D/A conversion circuit 4 as the signal converting means.

Next, the operation of the thus configured sound signal processing apparatus 1 of the seventh embodiment of the present invention will be described.

First, the sound signal transmitting apparatus 2 generates the reproduced sound signal A consisting of samples of digital sound signals expressed by 16 bits, and outputs it to the bit count reduction circuit 8.

Then, the bit count reduction circuit 8 receives the reproduced sound signal A from the sound signal transmitting apparatus 2, extracts the high-order eight bits of each of the samples of 16-bit digital signals constituting the reproduced sound signal A, and generates the FR bit count reduced sound signal G, FL bit count reduced sound signal H, RR bit count reduced sound signal J, and RL bit reduced sound signal M.

Figure 19:
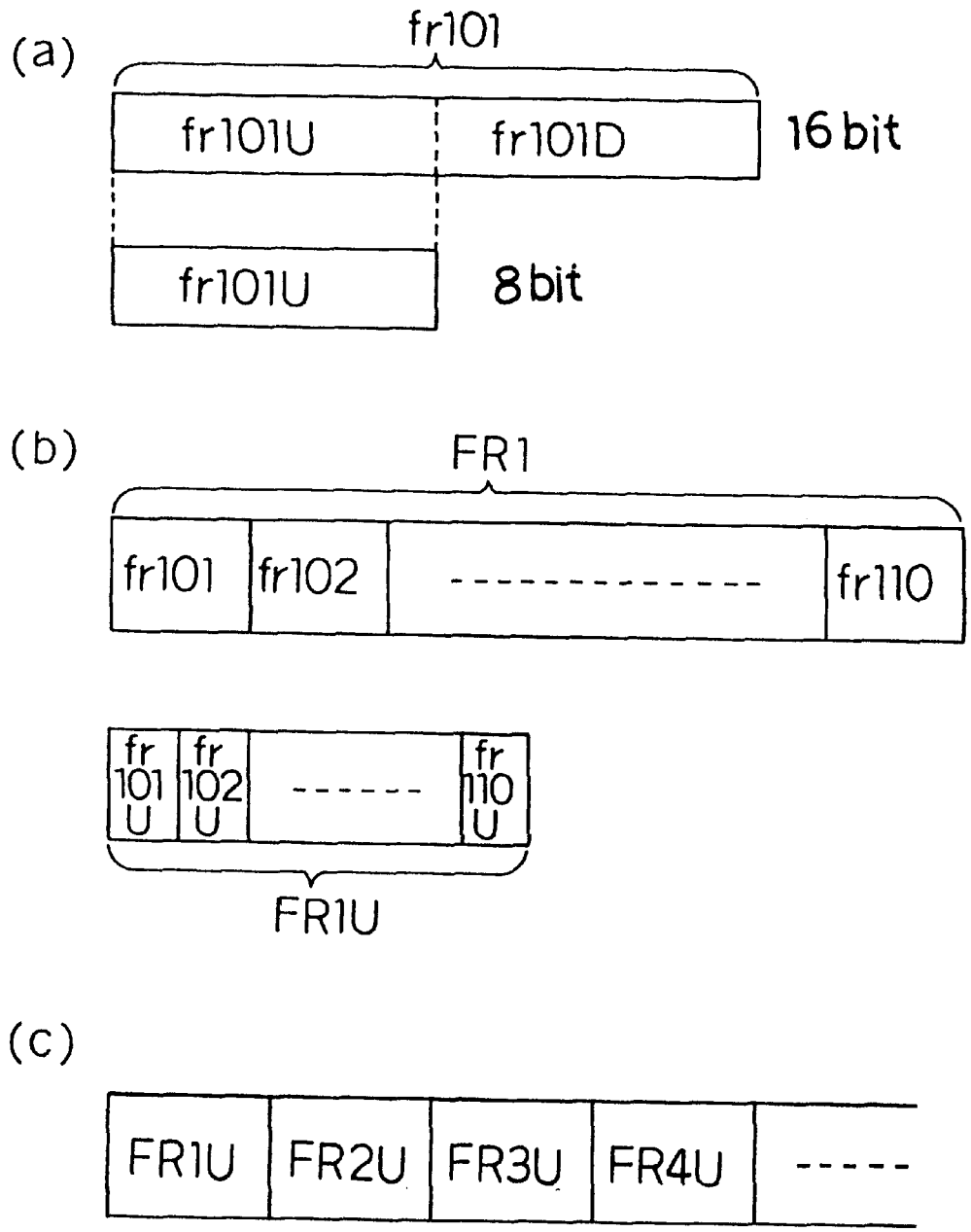
FIG. 19 is a structural diagram of an FR bit count reduced sound signal G in the seventh embodiment of the present invention.

The FR bit count reduced sound signal G will be explained in detail. In FIG. 19(*a*), fr101 is a sample in the digital signal unit FR1 explained in the sixth embodiment. Here, however, the sample fr101 is a 16-bit digital sound signal. Further, fr101U is a digital sound signal representing the high-order eight bits of the sample fr101, and fr101D is a digital sound signal representing the low-order eight bits of the same sample fr101. Likewise, fr102U, . . . , fr110U in FIG. 19(*b*) are digital sound signals created by extracting high-order eight bits from the respective samples fr102, . . . , fr110 in the digital signal unit FR1. Then, these signals fr101U, fr102U, . . . , fr110U are arranged in the order of fr101U, fr102U, . . . , fr110U to generate a digital signal unit FR1U. Since the samples in the digital signal units FR2, FR3, FR4, . . . explained in the sixth embodiment are all 16-bit digital sound signals, FR2U, FR3U, FR4U, . . . in FIG. 19(*c*), like the digital signal unit FR1U, are digital signal units obtained by extracting high-order eight bits from all the samples in the digital signal units FR2, FR3, FR4, . . . , and by arranging and grouping the thus extracted 8-bit digital sound signal samples in the order corresponding to the order in which the samples before extraction were arranged; these digital signal units FR2U, FR3U, FR4U, . . . are labeled and numbered in corresponding relationship to the digital signal units FR2, FR3, FR4, respectively. Finally, the digital signal units FR1U, FR2U, FR3U, . . . are arranged in the order of FR1U, FR2U, FR3U, . . . , to create a digital sound signal which is the FR bit count reduced sound signal G. That is, the FR bit count reduced sound signal G is a digital signal corresponding to the sound reduced by a prescribed sound magnitude compared with the sound recorded at the corner FR of the stage.

The FL bit count reduced sound signal H, the RR bit count reduced sound signal J, and the RL bit count reduced sound signal M will be explained in like manner. The samples in the digital signal units FL1, FL2, FL3, . . . , RR1, RR2, RR3, . . . , and RL1, RL2, RL3, . . . , explained in the sixth embodiment, are all 16-bit digital sound signals, and FL1U, FL2U, FL3U, . . . , RR1U, RR2U, RR3U, . . . , and RL1U, RL2U, RL3U, . . . are generated by extracting high-order eight bits from all of these samples to create new samples of 8-bit digital sound signals, and by arranging and grouping these new samples in the order corresponding to the order in which the original samples before extraction were arranged. Here, FL1U, FL2U, FL3U, . . . , RR1U, RR2U, RR3U, . . . , and RL1U, RL2U, RL3U, . . . are digital signal units labeled and numbered in corresponding relationship to the digital signal units FL1, FL2, FL3, . . . , RR1, RR2, RR3, and RL1, RL2, RL3, . . . , respectively. These digital signal units FL1U, FL2U, FL3U, . . . , RR14, RR24, RR34, . . . , and RR1U, RR2U, RR3U, . . . are then arranged in the order of FL1U, FL2U, FL3U, . . . , RR1U, RR2U, RR3U, . . . , and RL1U, RL2U, RL3U, . . . , respectively, to generate the FL bit count reduced sound signal H, the RR bit count reduced sound signal J, and the RL bit count reduced sound signal M. That is, the FL bit count reduced sound signal H, the RR bit count reduced sound signal J, and the RL bit count reduced sound signal M are each a digital sound signal corresponding to the sound reduced by the prescribed sound magnitude compared with the sound recorded at the corner FL, RR, or RL of the stage.

After that, the bit count reduction circuit 8 supplies the FR bit count reduced sound signal G, the FL bit count reduced sound signal H, the RR bit count reduced sound signal J, and the RL bit count reduced sound signal M to the D/A conversion circuit 4.

Further, the D/A conversion circuit 4 takes as inputs the FR bit count reduced sound signal G, the FL bit count reduced sound signal H, the RR bit count reduced sound signal J, and the RL bit count reduced sound signal M from the bit count reduction circuit 8, and converts these digital signals into analog signals, i.e., the FR analog sound signal Ga, the FL analog sound signal Ha, the RR analog sound signal Ja, and the RL analog sound signal Ma, respectively. Thereafter, the D/A conversion circuit 4 supplies the FR analog sound signal Ga to the FR bit count demodulation circuit 9a, and likewise, the FL analog sound signal Ha, the RR analog sound signal Ja, and the RL analog sound signal Ma to the FL bit count demodulation circuit 9b, the RR bit count demodulation circuit 9c, and the RL bit count demodulation circuit 9d, respectively. Here, since the D/A conversion circuit 4 converts the digital sound signals, whose bit count is one half the bit count of the samples constituting the reproduced sound signal A, into analog signals, its burden is reduced by half as compared with the case if the full-bit digital sound signals of the samples constituting the reproduced sound signal A were converted into analog sound signals.

Figure 20:
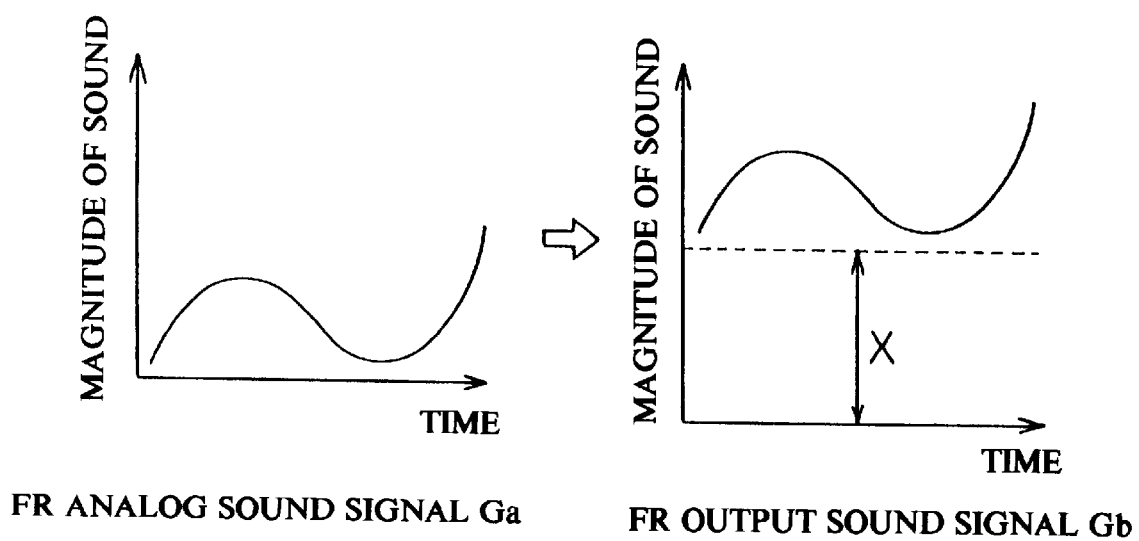
FIG. 20 is a structural diagram of an FR output sound signal Gb in the seventh embodiment of the present invention.

Next, the FR bit count demodulation circuit 9a takes as an input the FR analog sound signal Ga output from the D/A conversion circuit 4. Since all the samples constituting the FR bit count reduced sound signal G, on which the analog sound signal Ga is based, are 8-bit digital sound signals, and since the FR bit count reduced signal G is generated by extracting the high-order eight bits of each of the corresponding samples of 16-bit digital sound signals constituting the reproduced sound signal A, the FR bit count demodulation circuit 9a adds the analog sound signal X corresponding to the prescribed sound magnitude uniformly to the entire FR analog sound signal Ga, as shown in FIG. 20, and thereby generates the FR output sound signal Gb, an analog sound signal corresponding to the sound substantially equal in magnitude to the sound recorded at the FR corner of the stage. After that, the FR bit count demodulation circuit 9a outputs the FR output sound signal Gb to the FR speaker 5.

Likewise, the FL bit count demodulation circuit 9b, the RR bit count demodulation circuit 9c, and the RL bit count demodulation circuit 9d each take as an input the FL analog sound signal Ha, RR analog sound signal Ja, or the RL analog sound signal Ma, and add the analog sound signal X corresponding to the prescribed sound magnitude to the entire analog signal, thereby generating the FL output sound signal Hb, RR output sound signal Jb, or RL output sound signal Mb, an analog signal corresponding to the sound substantially equal in magnitude to the sound recorded at the corner FL, RR, or RL of the stage, and outputting the generated sound to the FL speaker 6, RR speaker 10, or RL speaker 11, respectively.

Finally, the FR speaker 5 receives the FR output sound signal Gb from the FR bit count demodulation circuit 9a, and reproduces the sound substantially equivalent to the sound recorded at the corner FR of the stage. Likewise, the FR speaker 6, the RR speaker 10, and the RL speaker 11 each receive the FL output sound signal Hb output from the FL bit count demodulation circuit 9b, the RR output sound signal Jb output from the RR bit count demodulation circuit 9c, or the RL output sound signal Mb output from the RL bit count demodulation circuit 9d, and reproduce the sound substantially equivalent to the sound recorded at the corner FL, RR, or RL of the stage.

In the seventh embodiment, the samples constituting the reproduced sound signal A have been described as being digital sound signals each expressed by 16 bits, but the samples constituting the reproduced sound signal A may be digital sound signals of any bit count. Further, the samples constituting the FR bit count reduced sound signal G, FL bit count reduced sound signal H, RR bit count reduced sound signal J, and RL bit count reduced sound signal M have been described as being digital sound signals expressed by eight bits, but the samples constituting the FR bit count reduced sound signal G, FL bit count reduced sound signal H, RR bit count reduced sound signal J, and RL bit count reduced sound signal M may be digital sound signals of any bit count, provided that the bit count is smaller than the bit count of the samples constituting the reproduced sound signal A. In this case, the FR bit count demodulation circuit 9a, the FL bit count demodulation circuit 9b, the RR bit count demodulation circuit 9c, and the RL bit count demodulation circuit 9d each need only be configured to generate the FR output sound signal Gb, FL output sound signal Hb, RR output sound signal Jb, or RL output sound signal Mb, an analog signal corresponding to the sound substantially equivalent to the sound recorded at the corner FR, FL, RR, or RL of the stage, by adding an analog sound signal corresponding to a prescribed sound magnitude uniformly to the entire FR analog sound signal Ga, FL analog sound signal Ha, RR analog sound signal Ja, or RL analog sound signal Ma, respectively.

Further, in the seventh embodiment, the bit count reduction circuit 8 has been described as generating the FR bit count reduced sound signal G, FL bit count reduced sound signal H, RR bit count reduced signal J, and RL bit count reduced signal M by extracting high-order eight bits from the respective samples constituting the reproduced sound signal A; alternatively, the bit count reduction circuit 8 may be configured to take a bit count reduction signal as an input, and to generate the FR bit count reduced sound signal G, FL bit count reduced sound signal H, RR bit count reduced signal J, and RL bit count reduced signal M by extracting, based on the bit count reduction signal, high-order eight bits from the respective samples constituting the reproduced sound signal A. In this case, the FR bit count demodulation circuit 9a, the FL bit count demodulation circuit 9b, the RR bit count demodulation circuit 9c, and the RL bit count demodulation circuit 9d each need only be configured to take the bit count reduction signal as an input, and to generate the FR output sound signal Gb, FL output sound signal Hb, RR output sound signal Jb, or RL output sound signal Mb, an analog signal corresponding to the sound substantially equivalent to the sound recorded at the corner FR, FL, RR, or RL of the stage, by adding, based on the bit count reduction signal, an analog sound signal corresponding to a prescribed sound magnitude uniformly to the entire FR analog sound signal Ga, FL analog sound signal Ha, RR analog sound signal Ja, or RL analog sound signal Ma, respectively.

Also, in the seventh embodiment, the FR bit count demodulation circuit 9a, the FL bit count demodulation circuit 9b, the RR bit count demodulation circuit 9c, and the RL bit count demodulation circuit 9d have each been described as generating the FR output sound signal Gb, FL output sound signal Hb, RR output sound signal Jb, or RL output sound signal Mb, an analog signal corresponding to the sound substantially equivalent to the sound recorded at the corner FR, FL, RR, or RL of the stage, by adding an analog sound signal corresponding to a prescribed sound magnitude uniformly to the entire FR analog sound signal Ga, FL analog sound signal Ha, RR analog sound signal Ja, or RL analog sound signal Ma, respectively; alternatively, the FR bit count demodulation circuit 9a, the FL bit count demodulation circuit 9b, the RR bit count demodulation circuit 9c, and the RL bit count demodulation circuit 9d may each be configured to generate the FR output sound signal Gb, FL output sound signal Hb, RR output sound signal Jb, or RL output sound signal Mb, an analog signal corresponding to the sound substantially equivalent to the sound recorded at the corner FR, FL, RR, or RL of the stage, by multiplying the analog value of the FR analog sound signal Ga, FL analog sound signal Ha, RR analog sound signal Ja, or RL analog sound signal Ma by 256. The only requirement is that the FR bit count demodulation circuit 9a, the FL bit count demodulation circuit 9b, the RR bit count demodulation circuit 9c, and the RL bit count demodulation circuit 9d should each be configured to generate the FR output sound signal Gb, FL output sound signal Hb, RR output sound signal Jb, or RL output sound signal Mb, an analog signal corresponding to the sound substantially equivalent to the sound recorded at the corner FR, FL, RR, or RL of the stage.

Furthermore, each sample described in the seventh embodiment may be a sample either of a linear bit representation or of a nonlinear bit representation.

Embodiment 8

The configuration of a sound signal processing apparatus according to an eighth embodiment of the present invention will be described first.

FIG. 21 is a block diagram of the sound signal processing apparatus according to the eighth embodiment. Numeral 1 is a sound signal processing apparatus, 2 is a sound signal transmitting apparatus, 12 is a sample deletion circuit, 4 is a D/A conversion circuit, 13a is an FR sample demodulation circuit, 13b is an FL sample demodulation circuit, 13c is an RR sample demodulation circuit, 13d is an RL sample demodulation circuit, 5 is an FR speaker, 6 is an FL speaker, 10 is an RR speaker, 11 is an RL speaker, A is a reproduced sound signal, N is an FR sample deleted sound signal, P is an FL sample deleted sound signal, Q is an RR sample deleted sound signal, S is an RL sample deleted sound signal, Na is an FR analog sound signal, Pa is an FL analog sound signal, Qa is an RR analog sound signal, Sa is an RL analog sound signal, Nb is an FR output sound signal, Pb is an FL output sound signal, Qb is an RR output sound signal, and Sb is an RL output sound signal.

The sound signal processing apparatus 1 consists of the sample deletion circuit 12 and the D/A conversion circuit 4. The sound signal transmitting apparatus 2 is, as explained in the sixth embodiment, a means for generating the reproduced sound signal A consisting of samples of digital sound signals, and for supplying it to the sample deletion circuit 12. The sample deletion circuit 12 is a means for taking as an input the reproduced sound signal A supplied from the sound signal transmitting apparatus 2, and for generating the FR sample deleted sound signal N, FL sample deleted sound signal P, RR sample deleted sound signal Q, and RL sample deleted sound signal S for output to the D/A conversion circuit 4, by deleting the even-numbered samples from the samples in the reproduced sound signal A corresponding to the sounds recorded at the corners FR, FL, RR, and RL of the stage. The FR sample deleted sound signal N will be explained later with reference to FIG. 22, together with the operation of the sound signal processing apparatus 1. Further, the FL sample deleted sound signal P, the RR sample deleted sound signal Q, and the RL sample deleted sound signal S will also be explained with reference to the FR sample deleted sound signal N. The D/A conversion circuit 4 is a means for taking as inputs the FR sample deleted sound signal N, FL sample deleted sound signal P, RR sample deleted sound signal Q, and RL sample deleted sound signal S output from the sample deletion circuit 12, and for converting these digital sound signals into analog sound signals, outputting the FR analog sound signal Na, the FR sample deleted sound signal N converted into an analog sound signal, to the FR sample demodulation circuit 13a, and likewise outputting the FL analog sound signal Pa, RR analog sound signal Qa, and RL analog sound signal Sa, which are respectively the FL sample reduced sound signal P, RR sample reduced sound signal Q, and RL sample reduced sound signal S converted into analog signals, to the FL sample demodulation circuit 13b, RR sample demodulation circuit 13c, and RL sample demodulation circuit 13d, respectively. The FR sample demodulation circuit 13a is a means for taking as an input the FR analog sound signal Na output from the D/A conversion circuit 4. Further, since the FR sample deleted sound signal N, on which the FR analog sound signal Na is based, is a digital sound signal generated by deleting the even-numbered samples from the samples in the reproduced sound signal A corresponding to the sound recorded at the corner FR of the stage, the FR sample demodulation circuit 13a is a means for calculating an average value between the digital values of every pair of adjacent samples in the FR sample deleted sound signal N, and for adding analog sound signals, each corresponding to an average digital sound signal having the thus calculated average value, to the FR analog sound signal Na by inserting the analog sound signals one each in a space corresponding to the position between the corresponding pair of samples used for the calculation of the digital value of the corresponding average digital sound signal, thereby generating the FR output sound signal Nb, an analog sound signal corresponding to the sound substantially equivalent to the sound recorded at the corner FR of the stage, and outputting the FR output sound signal Nb to the FR speaker 5. Likewise, the FL sample demodulation circuit 13b, the RR sample demodulation circuit 13c, and the RL sample demodulation circuit 13d are each a means for taking as an input the FL analog sound signal Pa, RR analog sound signal Qa, or RL analog sound signal Sa from the D/A conversion circuit 4 and calculating an average value between the digital values of every pair of adjacent samples in the original signals on which the respective analog sound signals are based, and for adding analog sound signals, each corresponding to an average digital sound signal having the thus calculated average value, to the FL analog sound signal Pa, RR analog sound signal Qa, or RL analog sound signal Sa by inserting the analog sound signals one each in a space corresponding to the position between the corresponding pair of samples used for the calculation of the digital value of the corresponding average digital sound signal, thereby generating the FL output sound signal Pb, RR output sound signal Qb, or RL output sound signal Sb, an analog sound signal corresponding to the sound substantially equivalent to the sound recorded at the corner FR, FL, or RR of the stage, and outputting the output sound signal to the FL speaker 6, RR speaker 10, or RL speaker 11, respectively. The FR speaker 5 is a means for taking as an input the FR output sound signal Nb from the FR sample demodulation circuit 13*a*, and for reproducing the sound substantially equivalent to the sound recorded at the corner FR of the stage. Likewise, the FR speaker 6, the RR speaker 10, and the RL speaker 11 are each a means for taking as an input the FL output sound signal Pb output from the FL sample demodulation circuit 13*b*, the RR output sound signal Qb output from the RR sample demodulation circuit 13*c*, or the RL output from sound signal Sb output from the RL sample demodulation circuit 13*d*, and for reproducing the sound substantially equivalent to the sound recorded at the corner FL, RR, or RL of the stage.

Here, the sample deletion circuit 12 has been used as the sample deleting means of the present invention and the D/A conversion circuit 4 as the signal converting means.

Next, the operation of the thus configured sound signal processing apparatus 1 of the eighth embodiment of the present invention will be described.

First, the sound signal transmitting apparatus 2 generates the reproduced sound signal A consisting of samples of digital sound signals, and outputs it to the sample deletion circuit 12.

Then, the sample deletion circuit 12 receives the reproduced sound signal A from the sound signal transmitting apparatus 2, and generates the FR sample deleted sound signal N, FL sample deleted sound signal P, RR sample deleted sound signal Q, and RL sample deleted sound signal S by deleting the even-numbered samples from the samples in the reproduced sound signal A corresponding to the sounds recorded at the corners FR, FL, RR and FL of the stage.

The FR sample deleted sound signal N will be explained in detail. First, the structure of the reproduced sound signal A is shown in FIG. 22(*a*). FR1, FL1, RR1, RL1, FR2, FL2, RR2, RL2, FR3, . . . are digital signal units constituting the reproduced sound signal A, explained in the fifth embodiment. Further, fr101, fr102, fr103, . . . , fr108, fr109, fr110 are samples in the digital signal unit FR1, explained in the sixth embodiment. Also, as explained in the sixth embodiment, each of the digital signal units constituting the reproduced sound signal A consists of 10 samples. Next, the structure of the FR sample deleted sound signal N is shown in FIG. 22(*b*). First, the even-numbered samples, that is, five samples fr102, fr104, fr106, fr108, and fr110, are deleted from the 10 samples in the digital signal unit FR1, and the remaining odd-numbered samples, that is, five samples fr101, fr103, fr105, fr107, and fr109, are arranged in the order of fr101, fr103, fr105, fr107, and fr109, to generate a digital signal unit FR1'. Likewise, the even-numbered samples are deleted from the 10 samples in each of the digital signal units FR2, FR3, FR4, . . . of the reproduced sound signal A, corresponding to the sound recorded at the corner FR of the stage, and the remaining odd-numbered samples are arranged in ascending order of the numbers appended thereto, to generate digital signal units FR2', FR3', FR4', . . . , respectively. The digital signal units FR2', FR3', FR4', . . . each consist of five samples, and are labeled and numbered in corresponding relationship to the digital signal units FR2, FR3, FR4, respectively. Then, the digital signal units FR1', FR2', . . . , FR3', . . . are arranged in the order of FR1', FR2', FR3', . . . , to generate the FR sample deleted sound signal N which is a digital sound signal. That is, the FR sample deleted sound signal N is a digital sound signal generated by deleting the even-numbered samples from all the samples in the digital sound signal corresponding to the sound recorded at the corner FR of the stage, and by arranging the remaining odd-numbered samples in the order of the remaining samples.

The FL sample deleted sound signal P, the RR sample deleted sound signal Q, and the RL sample deleted sound signal S will be explained in like manner. The even-numbered samples are deleted from the 10 samples in each of the digital signal units FL1, FL2, FL3, . . . , RR1, RR2, RR3, . . . and RL1, RL2, RL3, . . . constituting the reproduced sound signal A explained in the sixth embodiment, and the remaining odd-numbered samples are arranged in the order of the remaining samples, to generate digital signal units FL1', FL2', FL3', . . . , RR1', RR2', RR3', . . . , and RL1', RL2', RL3', . . . , respectively. All of these digital signal units are labeled and numbered in corresponding relationship to the digital signal units before deletion of the samples. Then, the digital signal units FL1', FL2', FL3', . . . are arranged in the order of FL1', FL2', FL3', . . . , to generate the FL sample deleted sound signal P; the digital signal units RR1', RR2', RR3', . . . are arranged in the order of RR1', RR2', RR3', . . . , to generate the RR sample deleted sound signal Q; and the digital signal units RL1', RL2', RL3', . . . are arranged in the order of RL1', RL2', RL3', . . . , to generate the RL sample deleted sound signal S. That is, the FL sample deleted sound signal P, the RR sample deleted sound signal Q, and the RL sample deleted sound signal S are each a digital sound signal generated by deleting the even-numbered samples from the samples in the digital sound signal corresponding to the sound recorded at the corner FL, RR, or RL of the stage, and by arranging the remaining odd-numbered samples in the order of the remaining samples.

After that, the sample deletion circuit 12 outputs the FR sample deleted sound signal N, FL sample deleted sound signal P, RR sample deleted sound signal Q, and RL sample deleted sound signal S to the D/A conversion circuit 4.

Further, the D/A conversion circuit 4 takes as inputs the FR sample deleted sound signal N, the FL sample deleted sound signal P, the RR sample deleted sound signal Q, and the RL sample deleted sound signal S from the sample deletion circuit 12, and converts these digital signals into analog signals, i.e., the FR analog sound signal Na, the FL analog sound signal Pa, the RR analog sound signal Qa, and the RL analog sound signal Sa, respectively. Thereafter, the D/A conversion circuit 4 supplies the FR analog sound signal Na to the FR sample demodulation circuit 13*a*, and likewise, the FL analog sound signal Pa, the RR analog sound signal Qa, and the RL analog sound signal Sa to the FL sample demodulation circuit 13*b*, the RR sample demodulation circuit 13*c*, and the RL sample demodulation circuit 13*d*, respectively. Here, since the D/A conversion circuit 4 converts one half of the samples constituting the reproduced sound signal A into analog signals, its burden is reduced by half as compared with the case if all the samples constituting the reproduced sound signal A were converted into analog sound signals.

Next, the FR sample demodulation circuit 13*a* receives the FR analog sound signal Na output from the D/A conversion circuit 4. The FR sample deleted sound signal N, on which the FR analog sound signal Na is based, is a sound signal generated by arranging in ascending order of the appended numbers the odd-numbered samples extracted from the samples of the digital sound signal corresponding to the sound recorded at the corner FR of the stage; accordingly, the FR sample demodulation circuit 13a calculates an average value between the digital values of every pair of adjacent samples, adds analog sound signals, each corresponding to an average digital sound signal having the thus calculated average value, to the FR analog sound signal Na by inserting the analog sound signals one each in a space corresponding to the position between the corresponding pair of samples used for the calculation of the digital value of the corresponding average digital sound signal, and thus generates the FR output sound signal Nb, an analog sound signal corresponding to the sound substantially equivalent to the sound recorded at the corner FR of the stage, and outputs the FR output sound signal Nb to the FR speaker 5. For example, if the digital values of the samples fr101 and fr103 in the FR sample deleted sound signal N are 771 and 357, respectively, the FR sample demodulation circuit 13a inserts an analog sound signal, corresponding to an average digital sound signal having a digital value of 564, in the position between the analog sound signals into which the samples fr101 and fr103 of the digital sound signal were converted.

Likewise, the FL sample demodulation circuit 13b, the RR sample demodulation circuit 13c, and the RL sample demodulation circuit 13d respectively receive the FL analog sound signal Pa, RR analog sound signal Qa, and RL analog sound signal Sa from the D/A conversion circuit 4, calculate an average value between the digital values of every pair of adjacent samples in the FL sample deleted sound signal P, RR sample deleted sound signal Q, and RL sample deleted sound signal S on which the respective analog sound signals are based, add analog sound signals, each corresponding to an average digital sound signal having the thus calculated average value, to the FL analog sound signal Pa, RR analog sound signal Qa, and RL analog sound signal Sa by inserting the analog sound signals one each in a space corresponding to the position between the corresponding pair of samples used for the calculation of the digital value of the corresponding average digital sound signal, and thus generate the FL output sound signal Pb, RR output sound signal Qb, and RL output sound signal Sb which are analog sound signals corresponding to the sounds substantially equivalent to the sounds recorded at the corners FL, RR, and RL of the stage. After that, the FL sample demodulation circuit 13b, the RR sample demodulation circuit 13c, and the RL sample demodulation circuit 13d output the FL output sound signal Pb, the RR output sound signal Qb, and the RL output sound signal Sb to the FL speaker 6, the RR speaker 10, and the RL speaker 11, respectively.

Finally, the FR speaker 5 receives the FR output sound signal Nb output from the FR sample demodulation circuit 13a, and reproduces the sound substantially equivalent to the sound recorded at the corner FR of the stage. Likewise, the FR speaker 6, the RR speaker 10, and the RL speaker 11 respectively receive the FL output sound signal Pb output from the FL sample demodulation circuit 13b, the RR output sound signal Qb output from the RR sample demodulation circuit 13c, and the RL output sound signal Sb output from the RL sample demodulation circuit 13d, and reproduce the sounds substantially equivalent to the sounds recorded at the corners FL, RR, and RL of the stage.

In the eighth embodiment, the sample deletion circuit 12 has been described as generating the FR sample deleted sound signal N, FL sample deleted sound signal P, RR sample deleted sound signal Q, and RL sample deleted sound signal S by deleting the even-numbered samples from the samples in the reproduced sound signal A corresponding to the sounds recorded at the corners FR, FL, RR, and RL of the stage, but the samples that the sample deletion circuit 12 delete from the reproduced sound signal A need not necessarily be limited to the even-numbered samples. The only requirement is that the sample deletion circuit 12 should be configured to delete samples from the reproduced analog sound signal A with a predetermined periodicity. In this case, the FR sample demodulation circuit 13a, the FL sample demodulation circuit 13b, the RR sample demodulation circuit 13c, and the RL sample demodulation circuit 13d need only calculate an average value between the digital values of every pair of samples on both sides of a position where a sample was deleted in the FR sample deleted sound signal N, FL sample deleted sound signal P, RR sample deleted sound signal Q, and RL sample deleted sound signal S on which the FR analog sound signal Na, FL analog sound signal Pa, RR analog sound signal Qa, and RL analog sound signal Sa are based, generate average digital sound signals each having the thus calculated average value, add analog sound signals corresponding to the thus generated average digital sound signals to the FR analog sound signal Na, FL analog sound signal Pa, RR analog sound signal Qa, and RL analog sound signal Sa by inserting the analog sound signals one each in a space therein corresponding to the position between the corresponding pair of samples used for the calculation of the digital value of the corresponding average digital sound signal, and thus generate the FR output sound signal Nb, FL output sound signal Pb, RR output sound signal Qb, and RL output sound signal Sb which are analog sound signals corresponding to the sounds substantially equivalent to the sounds recorded at the corners FR, FL, RR, and RL of the stage.

Further, in the eighth embodiment, the sample deletion circuit 12 has been described as generating the FR sample deleted sound signal N, FL sample deleted sound signal P, RR sample deleted sound signal Q, and RL sample deleted sound signal S by deleting the even-numbered samples from the samples in the reproduced sound signal A corresponding to the sounds recorded at the corners FR, FL, RR, and RL of the stage; alternatively, the sample deletion circuit 12 may be configured to take a sample deletion signal as an input, and to generate the FR sample deleted sound signal N, FL sample deleted sound signal P, RR sample deleted sound signal Q, and RL sample deleted sound signal S by deleting, based on the sample deletion signal, designated samples from the samples constituting the reproduced sound signal A. In this case, the FR sample demodulation circuit 13a, the FL sample demodulation circuit 13b, the RR sample demodulation circuit 13c, and the RL sample demodulation circuit 13d need only take the sample deletion signal as their inputs, calculate, based on the sample deletion signal, an average value between the digital values of every prescribed pair of samples in the FR sample deleted sound signal N, FL sample deleted sound signal P, RR sample deleted sound signal Q, and RL sample deleted sound signal S on which the FR analog sound signal Na, FL analog sound signal Pa, RR analog sound signal Qa, and RL analog sound signal Sa are based, generate average digital sound signals each having the thus calculated average value, add analog sound signals corresponding to the thus generated average digital sound signals to the FR analog sound signal Na, FL analog sound signal Pa, RR analog sound signal Qa, and RL analog sound signal Sa by inserting the analog sound signals one each in a space therein corresponding to the position between the corresponding pair of samples used for the calculation of the digital value of the corresponding average digital sound signal, and thus generate the FR output sound signal Nb, FL output sound signal Pb, RR output sound signal Qb, and RL output sound signal Sb which are analog sound signals corresponding to the sounds substantially equivalent to the sounds recorded at the corners FR, FL, RR, and RL of the stage.

In the sixth, seventh, and eighth embodiments, the digital signal units FR1, FL1, RR1, RL1, FR2, FL2, RR2, RL2, FR3, . . . constituting the reproduced sound signal A have each been described as consisting of 10 samples, but the number of samples constituting each digital signal unit need not necessarily be limited to 10. The only requirement is that the digital signal units have the same number of samples taken at the corresponding sampling instants from the played music.

In the fifth, sixth, seventh, and eighth embodiments, the reproduced sound signal A has been described as being a digital sound signal consisting of digital sound signals corresponding to the four channel sounds recorded at the four corners FR, FL, RR, and RL of the stage, but the reproduced sound signal A is not restricted to a digital sound signal consisting of digital sound signals corresponding to recorded sounds; further, the number of channels need not necessarily be limited to four. The only requirement is that, in the fifth and sixth embodiments, the reproduced sound signal A should be a sound signal digitally representing a plurality of sounds related to each other, and in the seventh and eighth embodiments, the reproduced sound signal A should be a sound signal digitally representing sounds.

Further, the functions of the sound signal processing apparatus 1 of the fifth, sixth, seventh, and/or eighth embodiments may be implemented as either hardware or software of a personal computer.

It is also possible to provide a medium holding programs for implementing the functions of the various means of the present invention.

As is apparent from the above description, the present invention can provide a sound processing apparatus that converts a digital sound signal having a large amount of information into an analog sound signal at high speed.

POTENTIAL UTILIZATION IN INDUSTRY

As described above, according to the present invention, since frame decimation is applied to the encoded video signal in the input signal, the resolution of the output video signal along the time axis degrades, but since the encoded voice signal is all decoded, the original voice signal can be output.

Further, according to the present invention, only representative information is extracted from each frame of the encoded voice signal, and such information is decoded for every frame; this degrades sound quality, but uninterrupted and intelligible voice can be output.

The present invention can also achieve a sound processing apparatus that converts a digital sound signal having a large amount of information into an analog sound signal at high speed.

What is claimed is:

1. A video and voice signal processing apparatus comprising:

signal receiving means for receiving an input signal containing a plurality of frames, each frame including an encoded voice signal and an encoded video signal, and for dividing each of said frames into an encoded voice signal block and an encoded video signal block for output;

voice signal processing means for converting said encoded voice signal block into a voice signal, and for outputting said voice signal;

video signal extracting means for decimating a plurality of encoded video signal blocks and for extracting one encoded video signal block of the plurality of encoded video signal blocks as a representative video signal block; and video signal processing means for converting said representative video signal block into a video signal, and for outputting said video signal.

2. A video and video signal processing apparatus according to claim 1, wherein said input signal is a signal dividable into units of frames treating one frame as a unit.

3. A video and voice signal processing apparatus according to claim 2, wherein said encoded voice signal and said encoded video signal are transmitted consecutively within said input signal.

4. A video and voice signal processing apparatus comprising:

signal receiving means for receiving an input signal containing a plurality of frames each frame including an encoded voice signal and an encoded video signal, and for dividing each of said frames into an encoded voice signal block and an encoded video signal block for output; said encoded voice signal block including a plurality of frequency bands;

voice signal extracting means for extracting at least one frequency band from the plurality of frequency bands in each of said frames, and for outputting said at least one frequency band in each of said frames as a representative voice signal;

voice signal processing means for converting said representative voice signal into a voice signal, and for outputting said voice signal;

video signal extracting means for decimating a plurality of encoded video signal blocks, and for extracting one encoded video signal block of the plurality of encoded video signal blocks as a representative video signal block; and video signal processing means for converting said representative video signal block into a video signal, and for outputting said video signal.

5. A video and voice signal processing apparatus according to claim 4, wherein said encoded voice signal block is divided into n frequency bands, each frequency band including frequency components of said voice signal, and said voice signal extracting means extracts m frequency bands from said encoded voice signal block, where $n \geq m \geq 1$, and outputs the m frequency bands as said representative voice signal.

* * * * *